United States Patent [19]
DeTemple et al.

[11] Patent Number: 5,960,708
[45] Date of Patent: Oct. 5, 1999

[54] ATMOSPHERIC CONTROLLED SHIPPING CONTAINER

[76] Inventors: Donald Edward DeTemple, 743 Bello St., Pismo Beach, Calif. 93449; Thomas Edward DeTemple, II, 1113 N. "E" St., Lompoc, Calif. 93436; Edward Bernhard DeTemple, 1015½ Sunset Dr., Apt. B, Arroyo Grande, Calif. 93420

[21] Appl. No.: 09/097,646

[22] Filed: Jun. 16, 1998

[51] Int. Cl.⁶ .......................... A47J 27/00; B65D 21/00; B65D 21/02; B65D 51/16
[52] U.S. Cl. .................. 99/472; 99/467; 99/473; 99/646 C; 206/509; 206/524.8
[58] Field of Search ............................ 99/342, 467, 468, 99/470, 472–476, 454, 494, 646 C; 206/508–512, 524.8, 811; 215/260, 262, 228, 309, 311; 220/231, 236; 426/49, 311, 281, 316, 318, 320

[56] References Cited

U.S. PATENT DOCUMENTS

| | | |
|---|---|---|
| 2,409,321 | 10/1946 | Stephan . |
| 3,366,231 | 1/1968 | Trakas . |
| 3,695,165 | 10/1972 | Sienkiewicz et al. ................ 99/475 X |
| 3,717,276 | 2/1973 | Luczak et al. . |
| 3,729,327 | 4/1973 | Linn et al. ................................. 99/467 |
| 3,910,176 | 10/1975 | Burrows ................................. 99/467 X |
| 3,913,781 | 10/1975 | Andreux . |
| 3,918,357 | 11/1975 | Tempero ................................. 99/467 X |
| 4,228,897 | 10/1980 | Underwood . |
| 4,287,997 | 9/1981 | Rolfe et al. . |
| 4,421,020 | 12/1983 | Gross ......................................... 99/472 |
| 4,460,102 | 7/1984 | Barringer . |
| 4,465,189 | 8/1984 | Molzan . |
| 4,480,748 | 11/1984 | Wind . |
| 4,627,336 | 12/1986 | Nam . |
| 4,660,714 | 4/1987 | Suzuki et al. . |
| 4,660,724 | 4/1987 | Gaynes . |
| 4,748,904 | 6/1988 | Razeto et al. ............................. 99/467 |
| 4,793,491 | 12/1988 | Wolf et al. . |
| 4,844,263 | 7/1989 | Hadtke . |
| 4,896,789 | 1/1990 | Federspiel . |
| 5,019,345 | 5/1991 | Lorenz . |
| 5,316,178 | 5/1994 | Garber, Jr. ............................ 206/523 X |
| 5,318,789 | 6/1994 | Nakagawa et al. ...................... 426/316 |
| 5,381,731 | 1/1995 | Thom, Jr. ................................ 99/471 X |
| 5,566,608 | 10/1996 | Vejdani et al. ............................. 99/475 |
| 5,570,623 | 11/1996 | Kiener et al. ............................. 99/472 |
| 5,711,211 | 1/1998 | Ide et al. ................................... 99/467 |
| 5,820,908 | 10/1998 | Li .......................................... 99/467 X |

FOREIGN PATENT DOCUMENTS

111198   5/1965   Netherlands .

Primary Examiner—Timothy F. Simone
Attorney, Agent, or Firm—Fitch, Even, Tabin & Flannery

[57] ABSTRACT

A stackable, atmospheric controlled container is provided having upper and lower members that are hermetically sealed together for containing perishables therein. Inlet and outlet valves are provided for allowing the interior of the container to be provided with gases or combinations of gases to retard the spoilage process for food products and extend the shelf life of perishables several times over their normal life. The valves allow the container interior to be pressurized, purged of oxygen, and/or maintained at vacuum condition. The present containers can be used for storage and transportation of perishable food and other items as well as delicate non-perishables such as electronic components. The ability to control the interior atmosphere such as by purging it of oxygen is advantageous in that it inhibits the buildup of corrosion on electronic parts and equipment. A resilient member preferably is provided in the interior of the container to keep the atmosphere or gases therein within a desired pressure range. The resilient member responds to pressure changes in the container interior by flexing to either increase the volume so that pressure gains are minimized or alternatively, by decreasing the volume so that interior pressure losses are minimized.

19 Claims, 25 Drawing Sheets

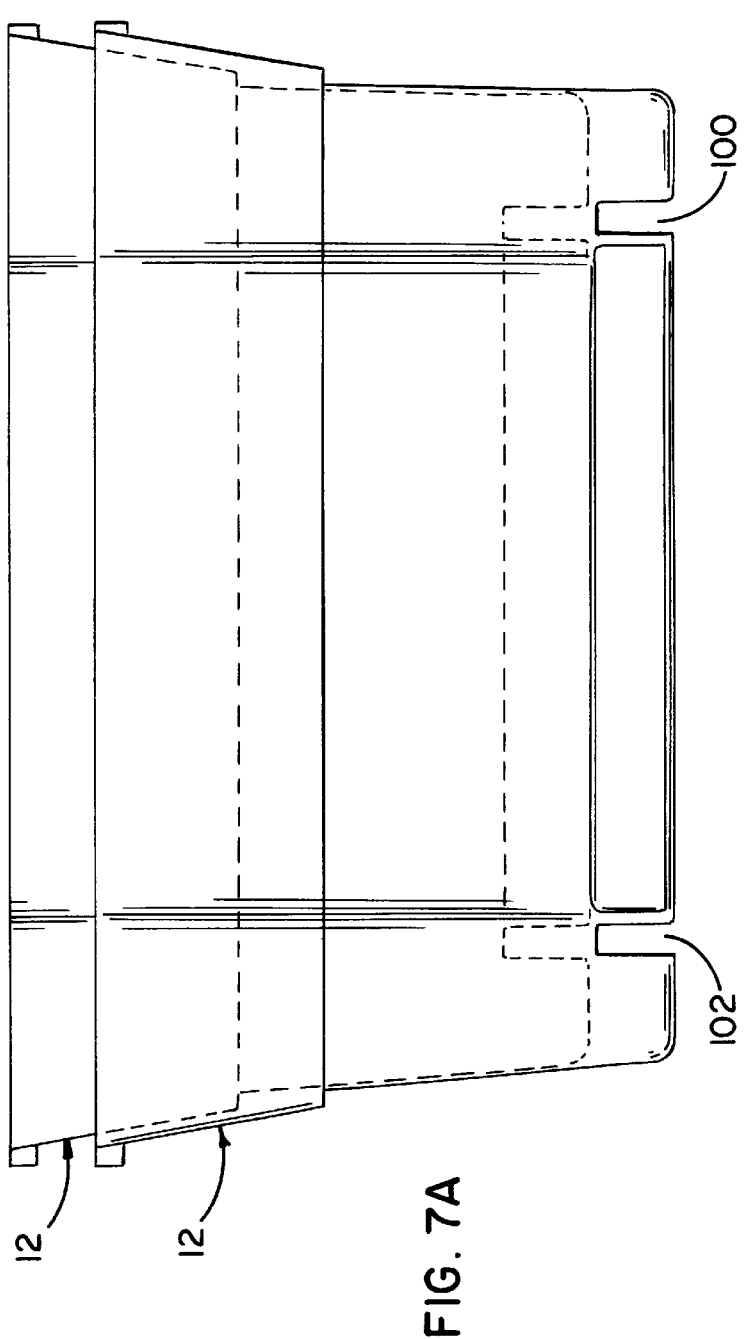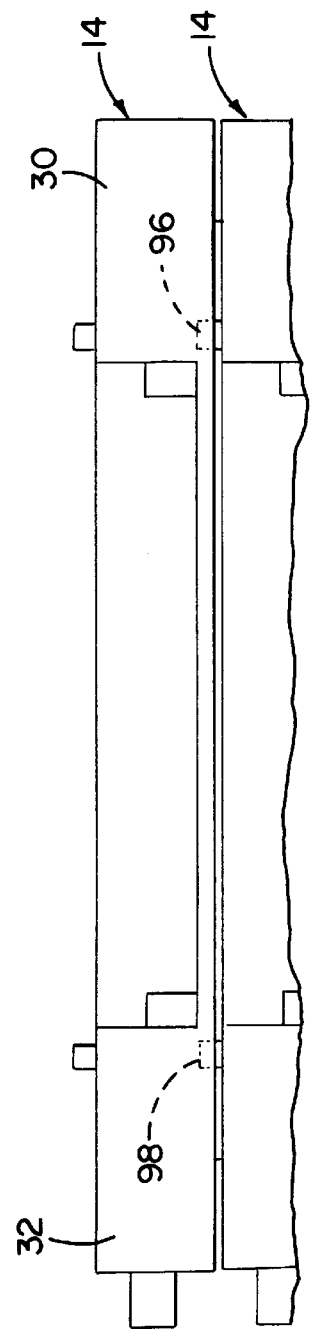
FIG. 7A
FIG. 7B

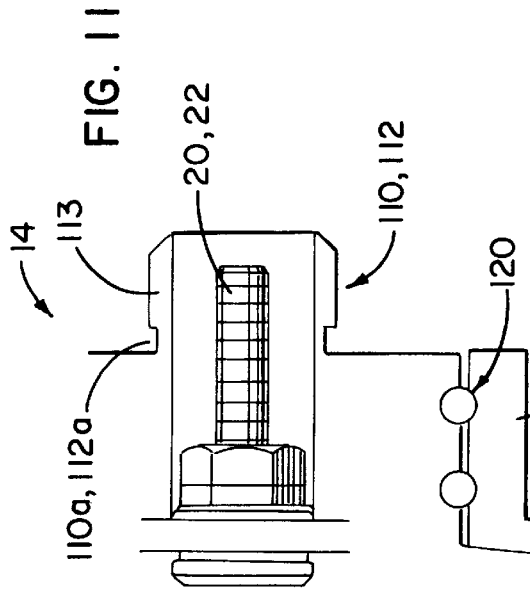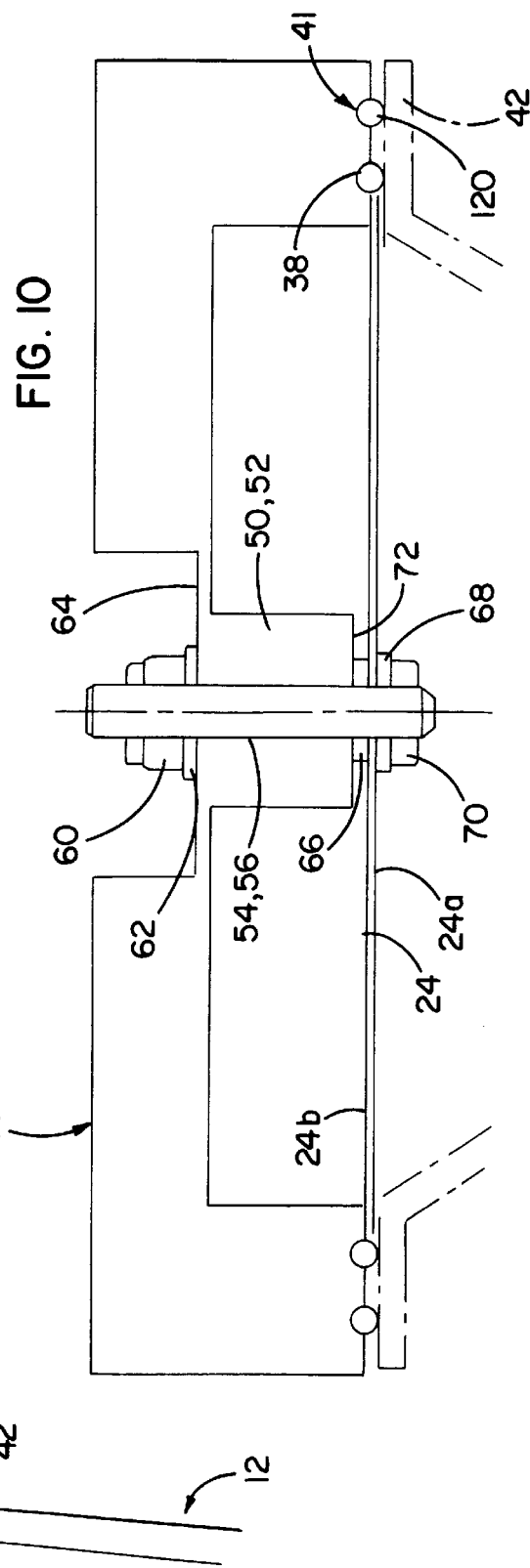

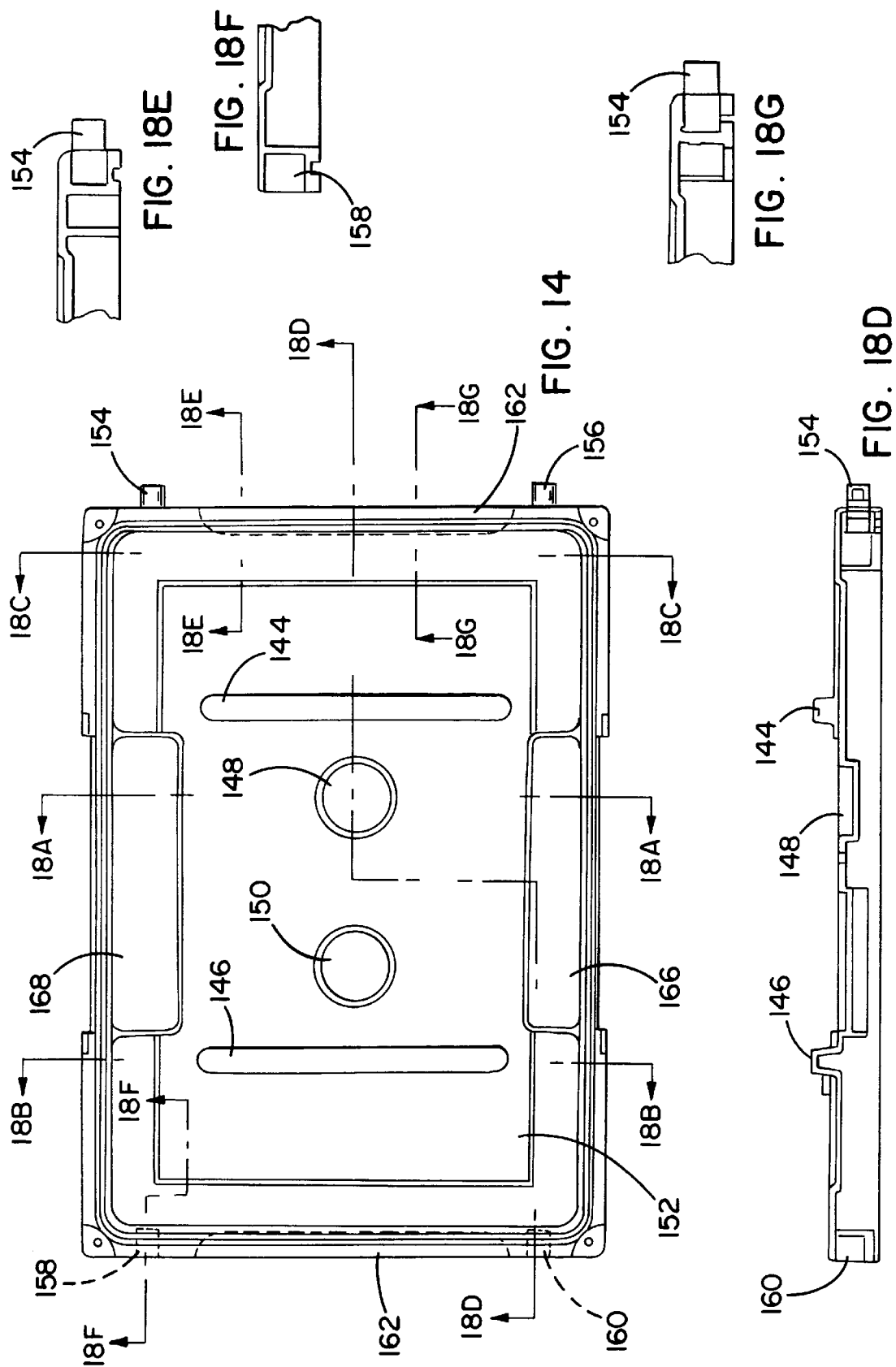

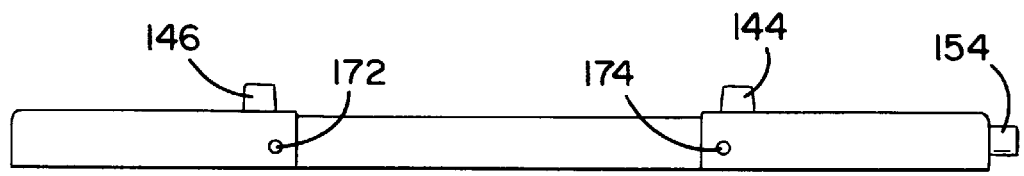
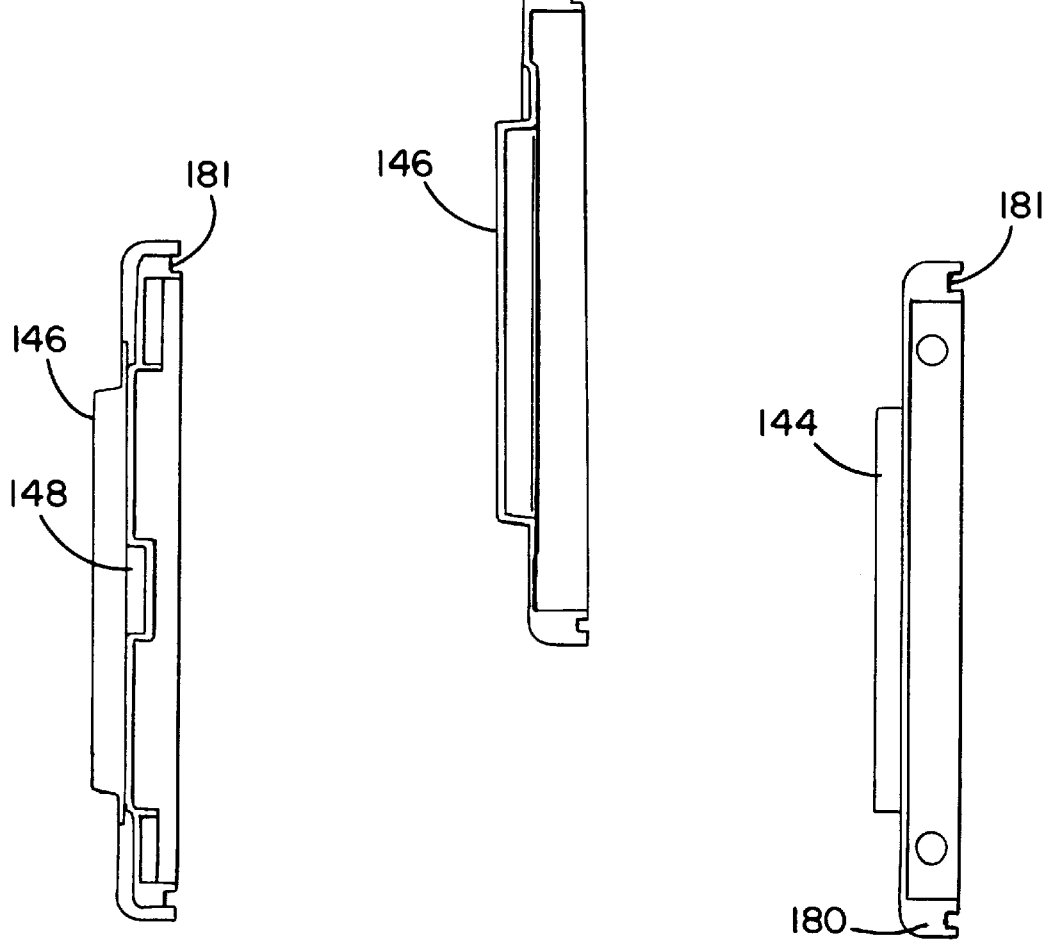

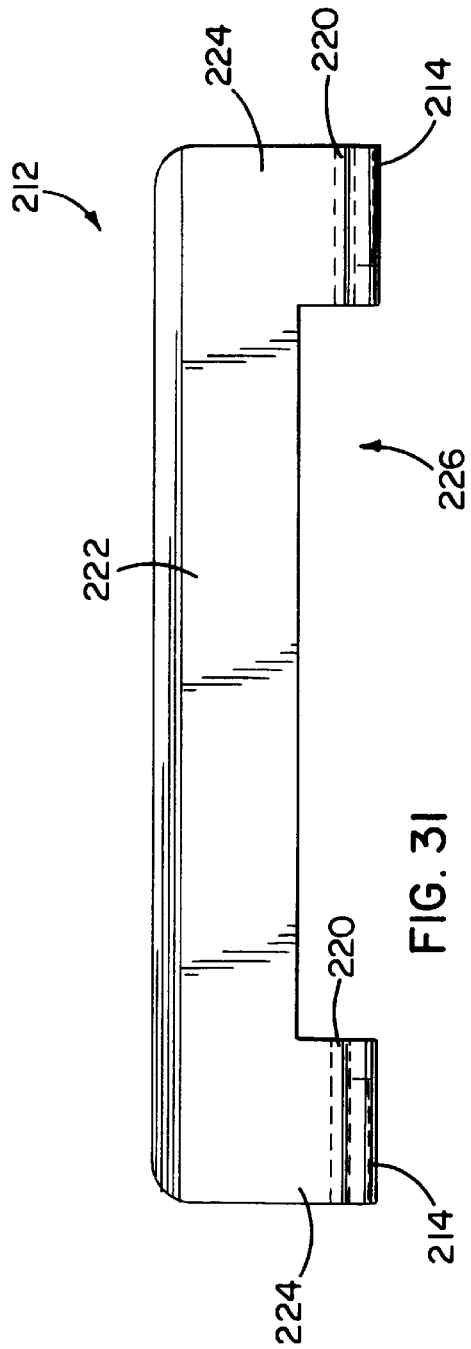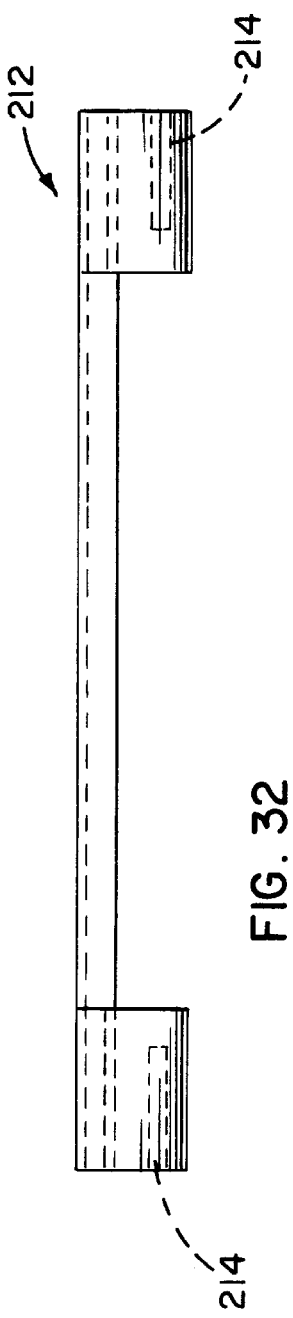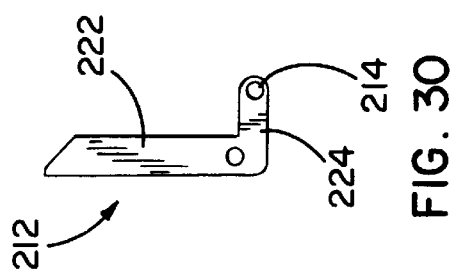

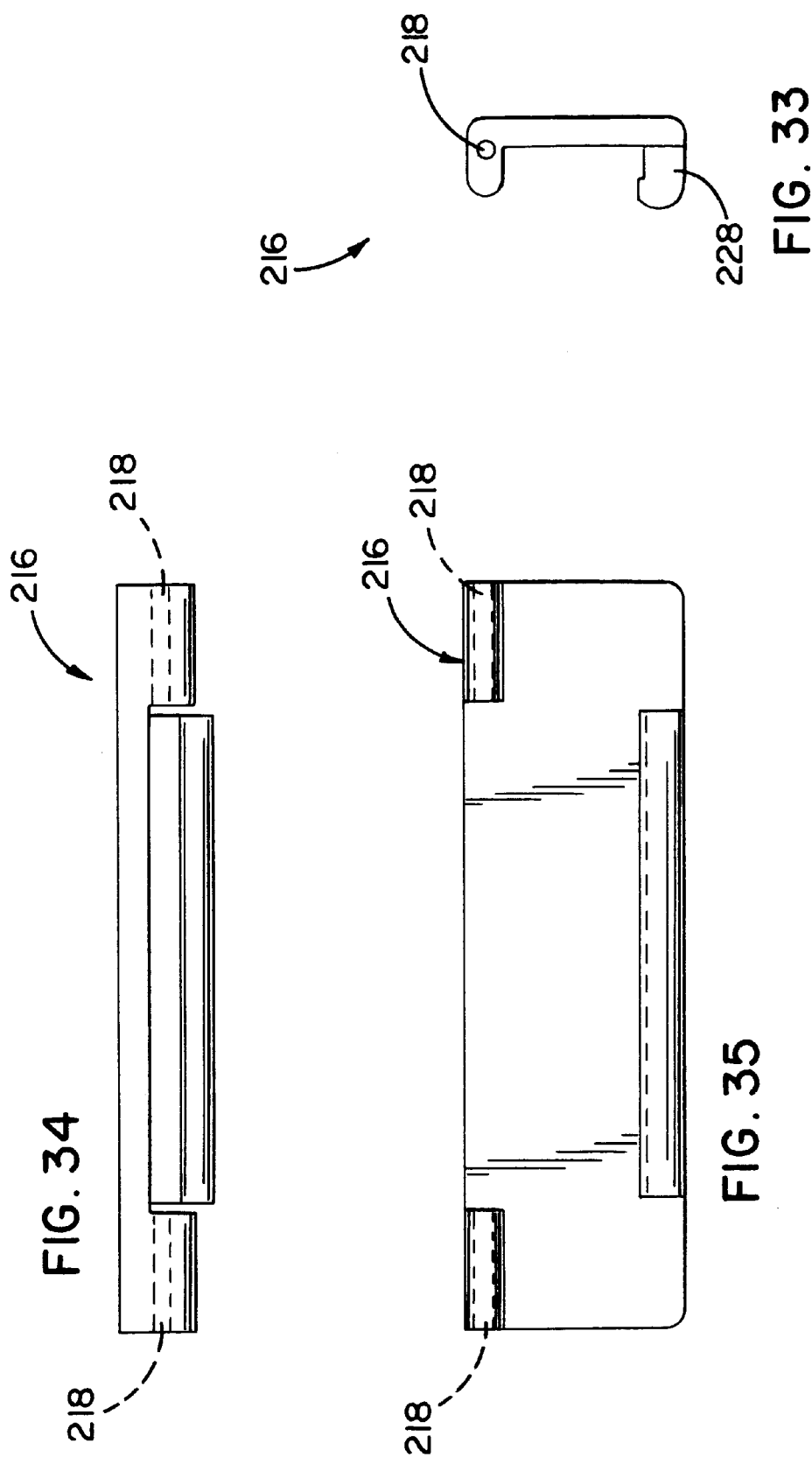

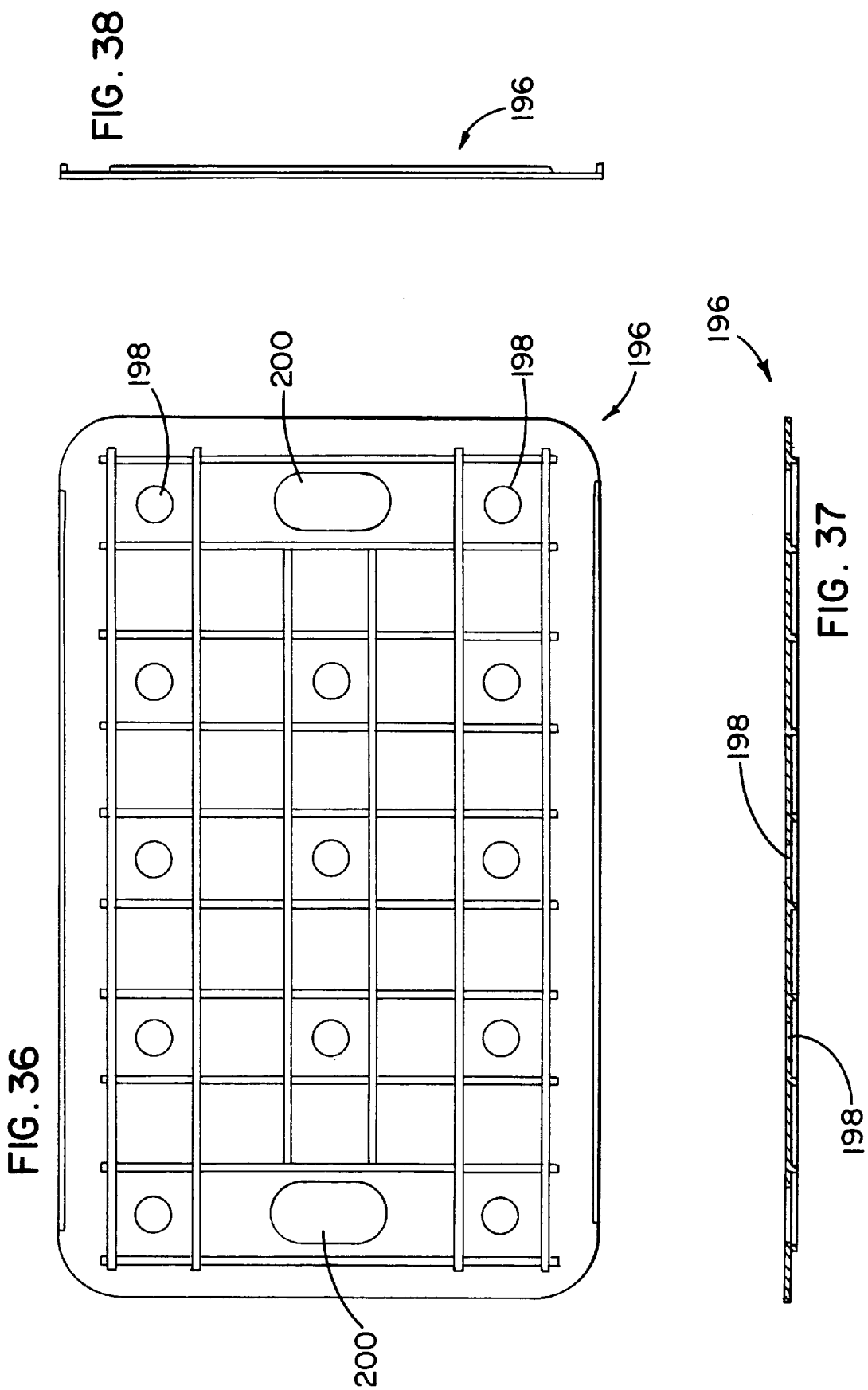

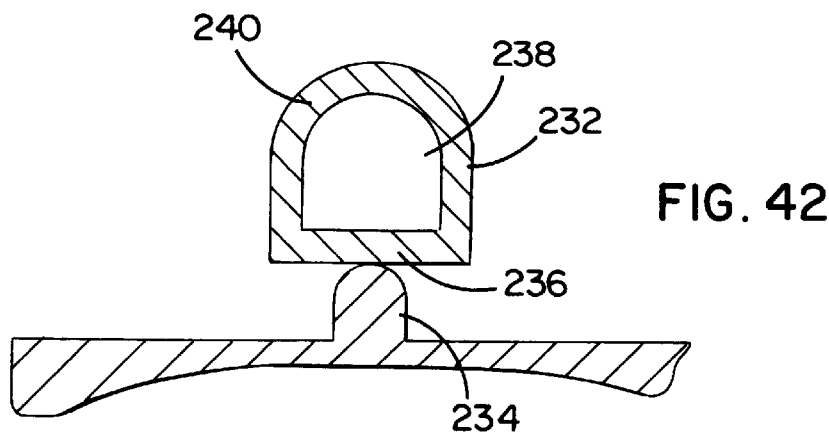
FIG. 42
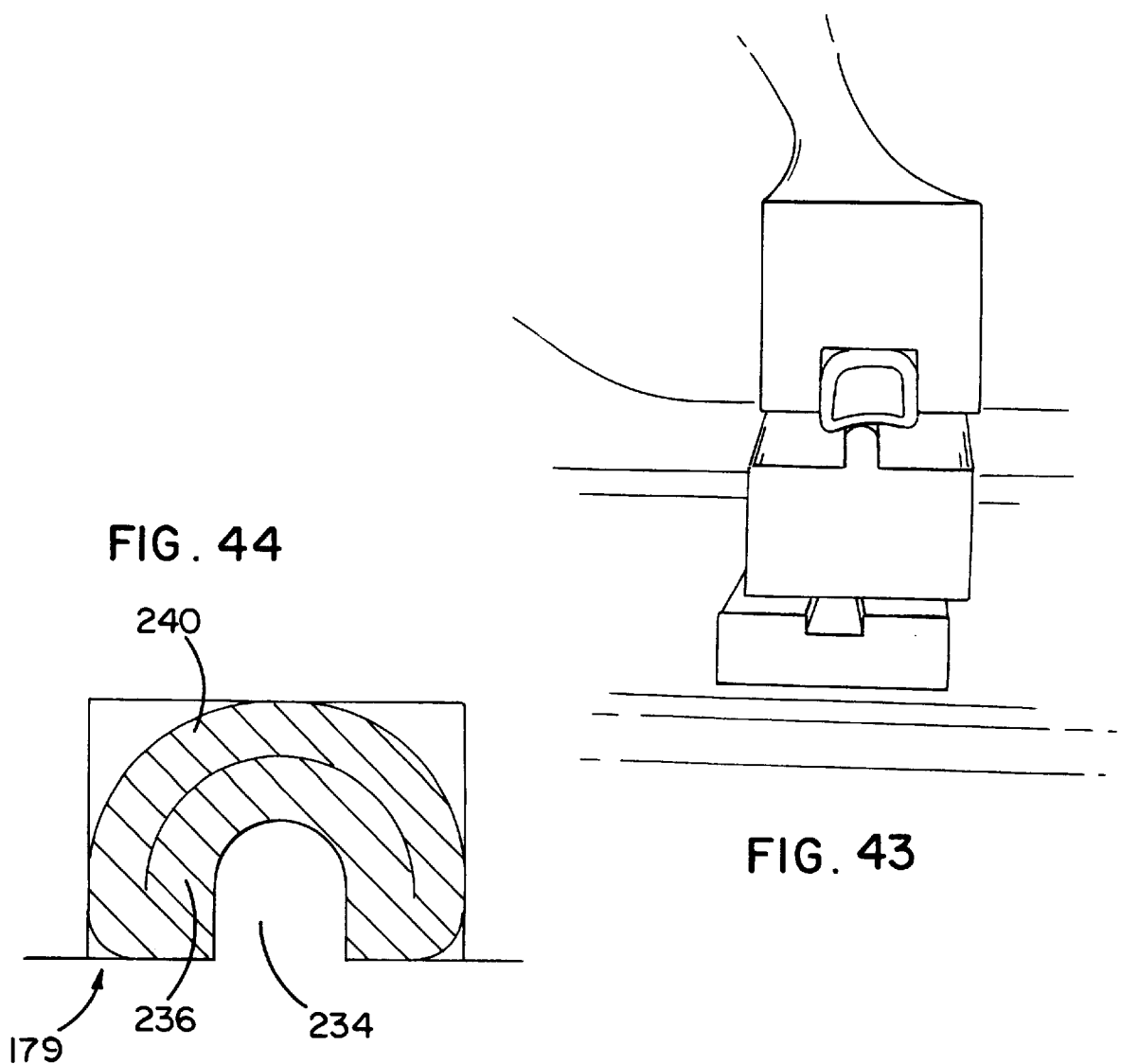
FIG. 44
FIG. 43

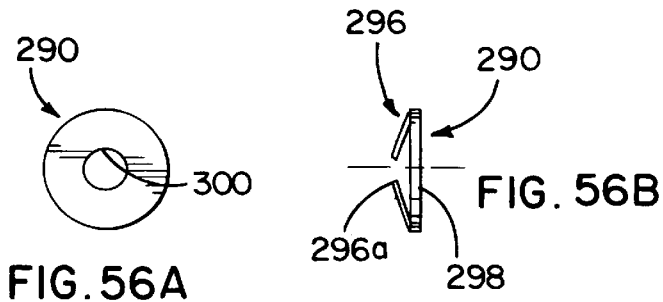
FIG. 56A
FIG. 56B
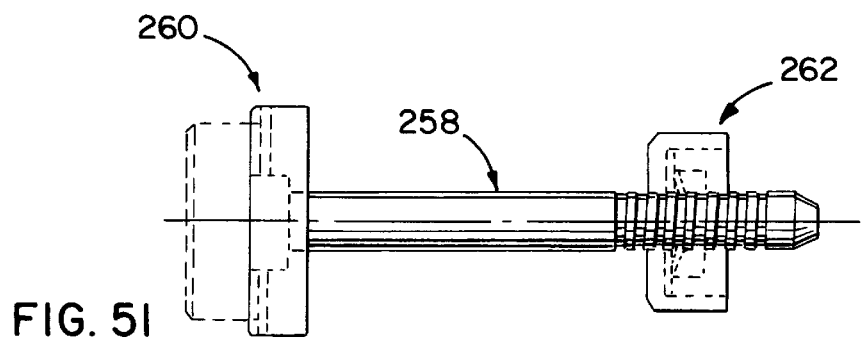
FIG. 51
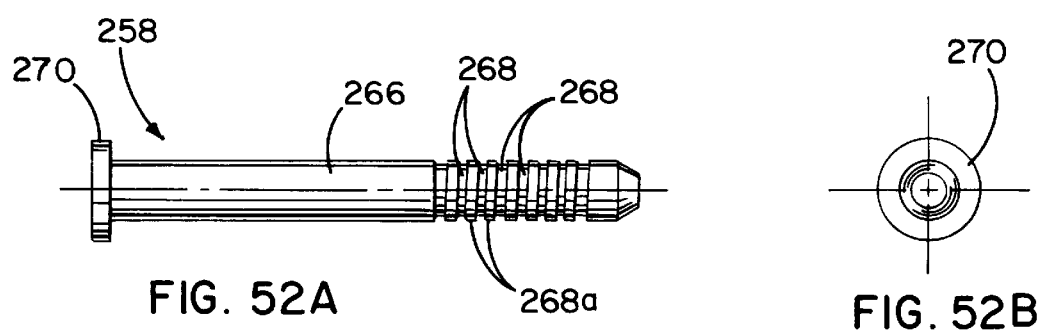
FIG. 52A
FIG. 52B
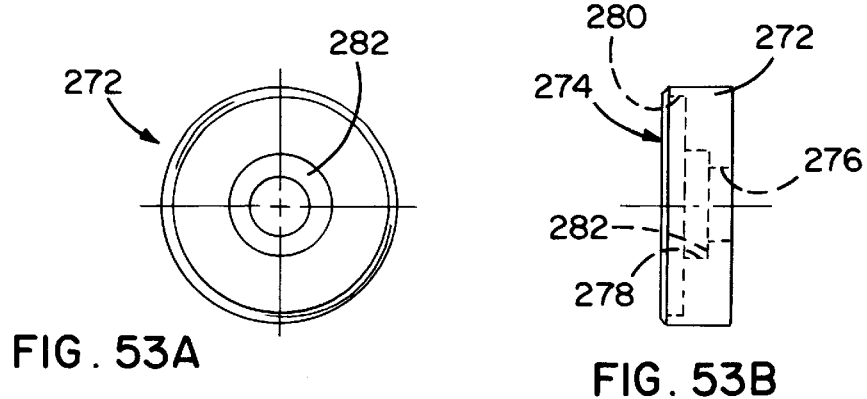
FIG. 53A
FIG. 53B

ATMOSPHERIC CONTROLLED SHIPPING CONTAINER

FIELD OF THE INVENTION

The invention relates to storage and shipping containers and, more particularly, to containers for storage and shipping of perishables and other atmosphere sensitive items in an atmosphere controlled interior of the container.

BACKGROUND OF THE INVENTION

It is highly desirable for containers designed for shipping of food such as fresh fruit, meat, vegetables, fish and other perishables to keep the food products fresh and free from damage and spoilage. In many instances, cardboard boxes are used to ship food products therein and, due to their construction and materials, are only intended for one time use. To help keep the food fresh, large amounts of ice are often packed in the boxes. Where the box containers are exposed to extreme conditions such as high temperatures or where the containers are left sitting for long periods of time at airports or travel for several days by sea, the melting of the ice can ruin the food by penetrating and soaking into the food and leaving a mush-like food product. Further, the cardboard boxes generally have to be thrown out after unpacking food therefrom, and thus do not provide the economic efficiencies that a multi-use container would provide.

Plastic shipping containers have been proposed for food products as an alternative to cardboard boxes, see e.g. U.S. Pat. No. 4,844,263. However, while the container of the '263 is an improvement over cardboard boxes, it still suffers from problems relating to the fact that it is essentially open to the exterior ambient environment which can be problematic as often times during storage and shipping harsh ambient conditions can be present. Thus, it would be desirable to provide a container for storage and shipping of perishable items that can be sealed from the exterior environment. Further, it would be advantageous if the atmosphere in the interior of the container could be closely regulated to maintain the freshness of the perishable items contained therein.

SUMMARY OF THE INVENTION

In accordance with the present invention, a stackable, atmospheric controlled container is provided having upper and lower members that are hermetically sealed together for containing perishables therein. Inlet and outlet valves are provided for allowing the interior of the container to be provided with gases or combinations of gases to retard the spoilage process for food products and extend the shelf life of perishables several times over their normal life. The valves also allow the container interior to be pressurized, purged of oxygen, and/or maintained at vacuum condition. While it is anticipated that the primary use for the present containers is to be for perishable food items, delicate non-perishables such as electronic components can also advantageously be stored and shipped therein. In particular, the ability to control the interior atmosphere such as by purging it of oxygen is advantageous in that it inhibits the buildup of corrosion on electronic parts and equipment.

Another feature of the invention is the ability to use a resilient member in the interior of the container to minimize unintended pressure losses or gains in the container interior space so as to keep the atmosphere or gases therein within a desired pressure range. The resilient member responds to pressure changes in the container interior by flexing to either increase the volume so that pressure gains are minimized or alternatively, by decreasing the volume so that interior pressure losses are minimized. Thus, for example, if it is desired to keep the interior of the container under pressure or at a vacuum condition, the resilient member assists in keeping the pressure at the desired level.

The present container is advantageously utilized in the storage and transport of perishables and other atmosphere sensitive items versus prior containers where the products are often subjected to rough handling, exposed to the atmosphere and can thus face extremes in thermal cycling. In many prior containers, their materials do not afford protection from thermal cycling or the physical impact they can be subjected to, particularly at extremely low temperatures.

In one form of the invention, the container includes a main lower housing member having a bottom and walls upstanding therefrom for containing perishables and other atmosphere sensitive items. An upper housing member is provided for being removably seated on top of the upstanding walls and cooperating with the lower housing member to form an interior container space in which perishables items are sealed for storage and transportation. A groove and resilient seal of the upper and lower housing members cooperate to hermetically seal the container interior space from the exterior environment when the upper member is seated on the upstanding walls. Latch portions of the container members are provided for being engaged and releaseably locking the upper member on the lower member with the seal tightly received in the groove by a compression fit. An inlet valve of the container provides communication between the interior space and exterior of the sealed container to allow selected gases to be introduced into the container interior space. An outlet valve of the container provides communication between the interior space and exterior of the sealed container to control pressure in the interior space and to exhaust gas from the space for being replaced with a different gas. Stacking members are formed on the upper and lower housing members for allowing a plurality of containers to be securely stacked and maintaining spaces between stacked containers for air flow therebetween to assist in keeping the container interior space at temperatures that minimize damage to the items sealed in the container for storage and transportation.

In one form, a resilient member is provided in the container interior space and which extends across the valves and through which the valves extend for supplying gases to and exhausting gases from the interior space with the member flexing in response to pressure changes in the space to keep gases within a desired predetermined pressure range.

In a preferred form, the resilient member is a flexible membrane of a material that is permeable to a specific type of gas exposed to one side of membrane for travel therethrough to isolate the gas from the items sealed in the container. The membrane material can be permeable to ethylene gas for trapping ethylene produced by food items contained with the space above the membrane isolated from the food items below the membrane.

In one form, the lower housing member includes at least one peripheral shoulder formed on the interior of the upstanding walls. A shelf partition member is provided for resting on the shoulder to provide different levels in the container interior space for holding the items therein separated from those items below the shelf.

The lower housing member can include vertical ribs over which the partition member extends with the ribs forming chambers therebetween for holding solid cooling materials. The partition member can include apertures therein for cooling of the interior space above the partition member by the cooling materials therebelow with the items in the container space separated from contact with cooling materials by the shelf partition member.

The lower member upstanding walls preferably are provided with a top to bottom taper to allow a plurality of lower members to be vertically stacked with the bottom of one lower member supported by the shoulder of another lower member immediately below the one lower member in the stack.

In one form, the stacking members include stacking ribs of the upper housing member and channels in the bottom of the lower housing member for receiving the ribs tightly therein with space over the top of the ribs for providing air flow between upper and lower housing members of adjacent stacked containers.

In one form, the stacking members include lateral projections and recesses which cooperate to lock containers together that are laterally adjacent each other.

In another form of the invention, the shipping container includes a container body having strong rigid walls for withstanding impacts to minimize damage to the items therein. A lid is provided for closing an interior space of the container when placed on the container body with a hermetic seal formed between the lid and container body to seal the container interior from the exterior environment. Valves of the container allow the pressure and atmosphere of the container interior to be regulated to keep the perishable items sealed therein fresh over long durations. A membrane is attached in the container interior to separate at least one interior chamber of the container from the remainder of the container interior space. The membrane is permeable to gas flow in a direction from the container interior space into the chamber and not permeable to flow from the chamber to the interior space for trapping and isolating specific types of gases, e.g. ethylene gas as respirated from food products, that tend to cause damage to perishable items. The membrane is also flexible so that it responds to changes in pressure in the container interior space by flexing to change the volume of the interior space undergoing pressure change in relation to the interior chamber to minimize unintended or undesirable pressure losses or gains in the container interior space. As is apparent, the use of valves and the flexible membrane having permeability to specific gases allows the atmosphere in the sealed container to be closely controlled for enhanced product freshness even when shipped in harsh environments and/or for long durations.

In one form, the container includes a security device that locks the container lid and body together to prevent access into the container interior space until the security device is destroyed. Preferably, the security device includes a shank that projects through the lid and container body and has a portion exposed for being severed to destroy the security device for allowing the container to be opened for accessing the interior thereof.

BRIEF DESCRIPTION OF THE DRAWINGS

FIG. 7A is an elevational view of a plurality of lower housing members in a vertical stack;

FIG. 7B is an elevational view of a plurality of upper housing members in a vertical stack;

FIG. 10 is a sectional view of the container showing an alternative larger resilient membrane which extends across the central and side recessed chambers of the upper housing member;

FIG. 11 is a enlarged sectional view showing an alternative lateral projection provided with an inlet or outlet valve;

FIG. 14 is a plan view of the upper housing member of the container of FIGS. 12 and 13;

FIG. 15 is a side elevational view of the upper housing member;

FIG. 18A is a cross-sectional view of the upper housing member taken along line C—C of FIG. 14;

FIG. 18B is a cross-sectional view of the upper housing member taken along line D—D of FIG. 14;

FIG. 18C is a cross-sectional view of the upper housing member taken along line E—E of FIG. 14;

FIG. 18D is a cross-sectional view of the upper housing member taken along line G—G of FIG. 14;

FIG. 18E is a cross-sectional view of the upper housing member;

FIG. 18F is a cross-sectional view of the upper housing member taken along line J—J of FIG. 14;

FIG. 18G is a cross-sectional view of the upper housing member taken along line K—K of FIG. 14;

FIGS. 30–32 are various views of a latch mounting member of the latch assembly of FIG. 29;

FIGS. 33–35 are various views of a latch member of the latch assembly of FIG. 29;

FIGS. 36–38 are various views of an upper shelf partition member for placement in the main lower housing member;

FIGS. 42–45 show the compression seal between the upper and lower housing members;

FIG. 51 is an elevational view of the security device assembled and removed from the container corner;

FIG. 52A is an elevational view of a security pin of the security device;

FIG. 52B is a plan view of the security pin of FIG. 52A;

FIG. 53A is a plan view of a pin cap member of the security device;

FIG. 53B is a side elevational view of the pin cap member of FIG. 53A;

FIG. 56A is a plan view of a retainer clip of the security device;

FIG. 56B is a side elevational view of the retainer clip of FIG. 56A;

DETAILED DESCRIPTION OF THE PREFERRED EMBODIMENTS

Figure 1:
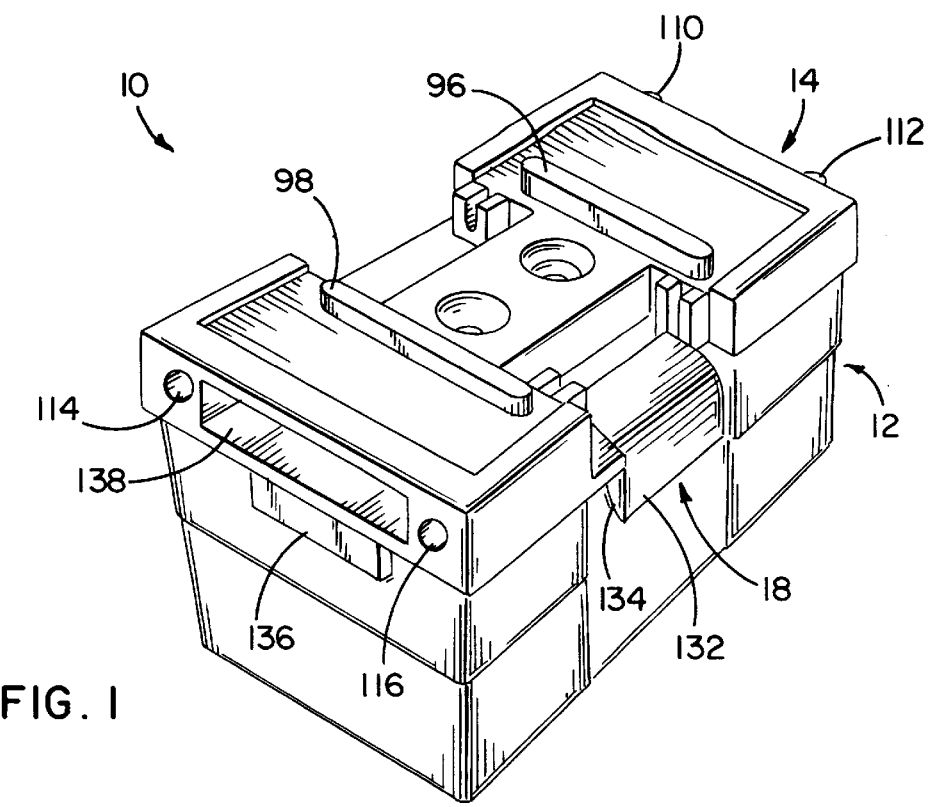
FIG. 1 is a perspective view of a stackable, atmospheric controlled container in accordance with the present invention showing a main lower housing member having an upper housing member seated and latched closed thereon for storage and shipping of perishable items.
Figure 2:
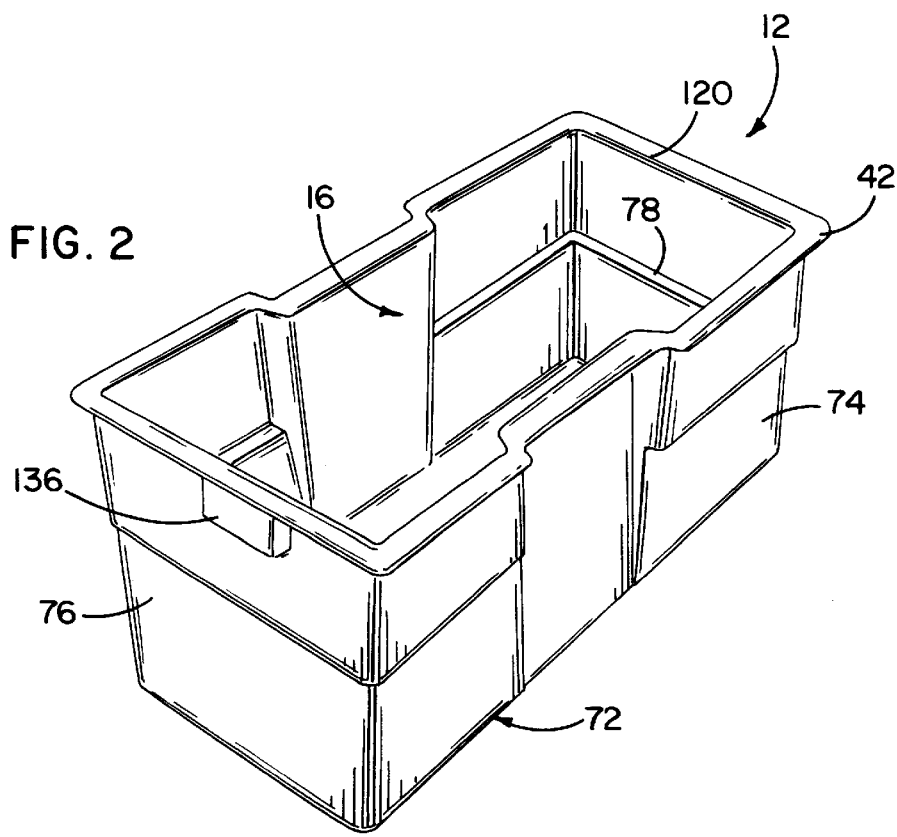
FIG. 2 is a perspective view of the lower housing member including a peripheral shoulder formed around the interior of upstanding walls of the lower housing member.
Figure 3:
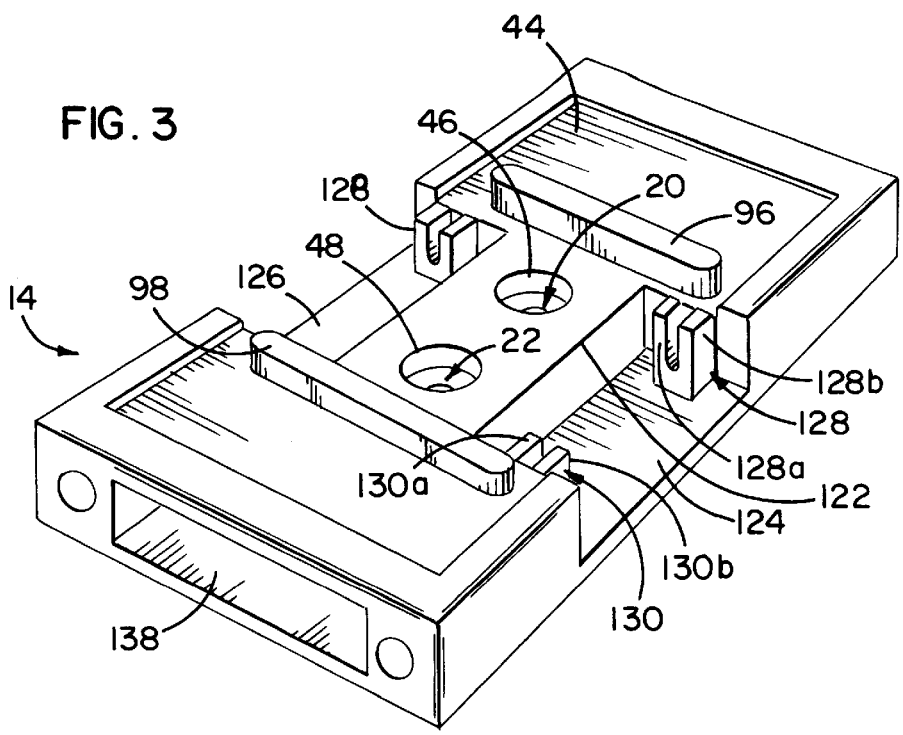
FIG. 3 is a perspective view of the upper housing member showing stacking ribs for stacking the containers vertically, and lateral projections and recesses for locking the containers horizontally.

In FIG. 1, a container 10 for containing perishables and other atmosphere sensitive items is shown and includes a main lower housing member or body 12 and an upper housing member or lid 14, as can be seen in FIGS. 2 and 3, respectively. The container housing members 12 and 14 can take on a generally rectangular configuration, and are preferably hermetically sealed together so that the container interior 16 is sealed off from the exterior ambient environment when the upper housing member 14 is latched closed on the main lower housing member 12 via latch assembly 18, as will be more fully described hereinafter.

The atmosphere in the container interior 16 defined by the sealed together housing members 12 and 14 can be closely controlled to preserve food stuffs and prevent damage to other atmosphere sensitive items that may be shipped in the containers 10 herein. For regulating the atmosphere in the container interior 16, the upper housing member 14 has inlet and outlet valves 20 and 22 mounted thereto for permitting communication between the container interior space 16 and the exterior of the sealed container 10. In this manner, selected gases and/or mixtures of gases can be introduced into the container interior space 16. For example, inert gases can be introduced into the space 16 as they tend to retard the spoilage process for food products. Also, where the container 10 is used for transporting electronic components, the container can be purged of oxygen via outlet valve 22 so as to inhibit the buildup of corrosion on the electronic parts and equipment in the container interior 16. In addition, the valves 20 and 22 allow the pressure in the container interior space 16 to be precisely controlled so that the space 16 can be kept under pressure or at a vacuum condition for long term preservation of the food products or other atmosphere sensitive items stored and shipped therein.

Figure 8:
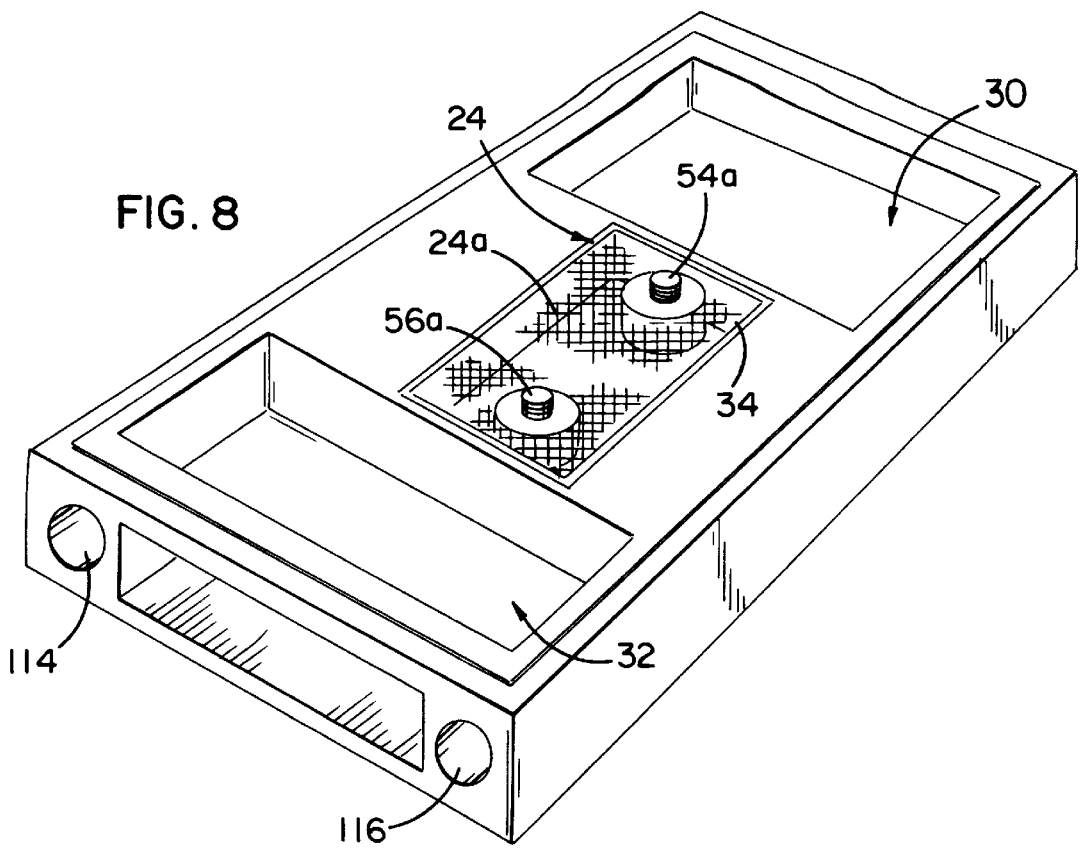
FIG. 8 is a perspective view of the underside of the upper housing member showing a flexible membrane overlying the central recessed chamber with inlet and outlet valves extending through the membrane.

Referring to FIG. 8, the container 10 can also include a resilient member 24 that lies across the bottoms of the valves 20 and 22 and through which the valves 20 and 22 extend. The resilient member 24 is effective to keep pressure changes in the space 16 within a predetermined range from when the container 10 is sealed and after the interior space 16 is pressurized or placed under a vacuum so that slight leakage from or into the container interior space 16 will not cause too much of a pressure change as the resilient member 24 will flex to change the volume in the portion of the space 16 in which the gases are contained. So, for instance, if the container space 16 is pressurized, the resilient member 24 will contract if leakage occurs; whereas, if the space 16 is kept under a vacuum, the member 24 will expand should there be leakage. Besides leakage, sources of pressure variations within the sealed container interior space 16 can also include pressure increases due to decomposition of perishables or dry ice, or by the respiration of gases from the product inside. In these instances, the resilient member 24 will expand to accommodate the increased pressure so as to maintain the pressure within an acceptable range for preserving the products disposed in the container interior space 16. In this manner, the resilient member 24 regulates and minimizes pressure changes by adjusting the volume for the gas in the interior space 16, versus the greater pressure changes that would be seen if the resilient member 24 were rigid leaving a constant volume for the changing amounts of gas in the space 16.

The resilient member 24 can take the form of a flexible membrane that is a flat piece of material which is permeable to specific types of gases for isolating these gases from the items sealed in the container 10. The membrane material is constructed such that gas flows through the membrane 24 in one direction but not the other so that the specific type of gas or gases exposed on one side 24a of the membrane 24 will be allowed to pass therethrough to the other side 24b of the membrane 24 with the gases being retained on the other side 24b of the membrane 24 so that gases cannot pass back through the membrane 24 from side 24b to side 24a thereof. One example of a gas that the membrane 24 can be designed to trap and isolate from the food items in the container space 16 is ethylene gas. Food products tend to respire ethylene gas, and the membrane 24 will allow the gas to rise and permeate therethrough and become trapped in chamber 26 above the membrane 24 recessed in the underside 28 of the upper housing member 14. By isolating the ethylene gas in the chamber 26 away from the food product, the shelf life of the food product will thereby be extended.

Figure 4:
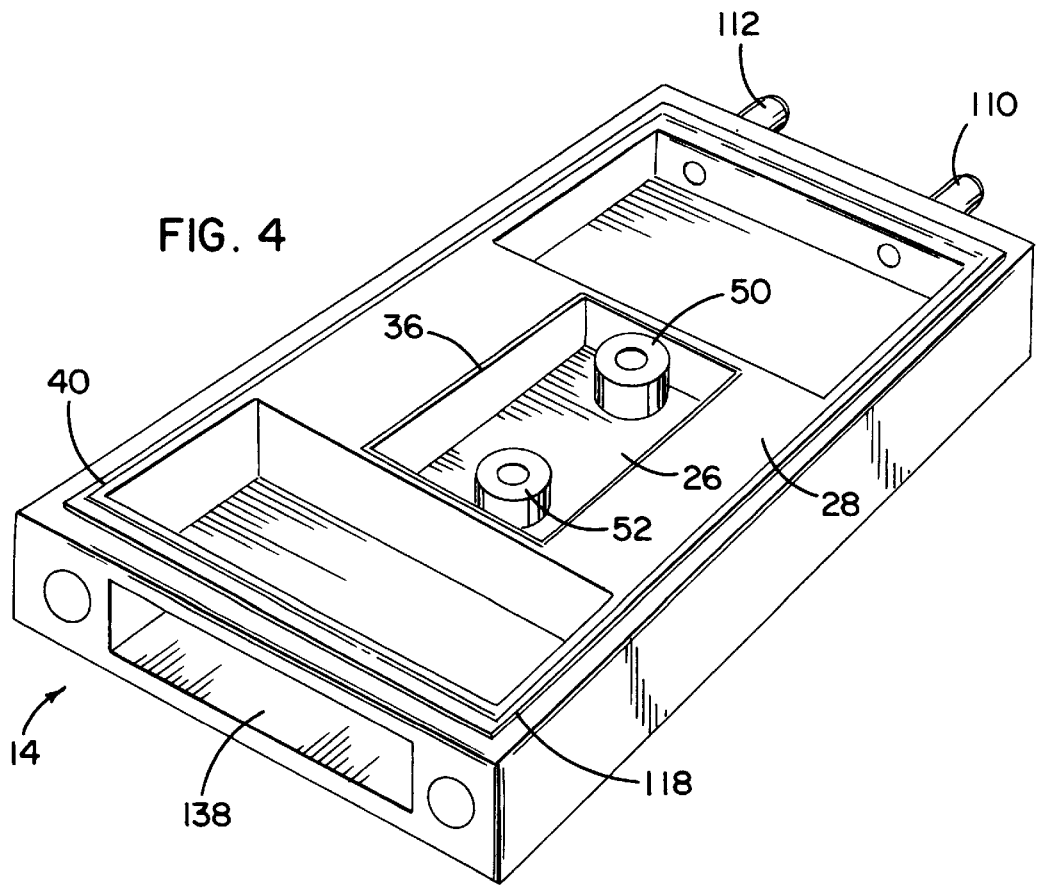
FIG. 4 is a perspective view of the underside of the upper housing member showing recessed chambers on either side of a central recessed chamber in which the valves are disposed.

As best seen in FIGS. 4 and 8, the upper housing member 14 can be provided with additional chambers 30 and 32 recessed in the upper housing member underside 28 on either side of the central recessed chamber 26. Additional resilient membranes (not shown) can be provided for overlying the chambers 30 and 32, or alternatively a single large resilient membrane 24 can be used for overlying all three chambers 26, 30 and 32, such as shown in FIG. 10.

The resilient membrane 24 is particularly useful when food products such as fruits and vegetables are shipped and/or stored in the containers 10, particularly when they will be in the containers 10 for long durations or be exposed to harsh environmental conditions. As previously mentioned, the containers 10 are also useful for other atmosphere sensitive items such as flowers, spices and electronic parts. Depending on the shipping and/or storage conditions, the resilient membrane 24 could also be advantageously utilized in the containers 10 containing these other types of atmosphere sensitive items for controlling the atmosphere therein, and particularly by minimizing the pressure variations in the container interior space 16.

For attaching the flexible membrane 24 about the center chamber 26, the membrane 24 can be formed with a resilient O-ring 34 attached around its periphery for being tightly received in a corresponding O-ring groove 36 formed in the underside 28 of the upper housing member 14 around the periphery of the central chamber 26. Alternatively, where a single larger resilient membrane 24 is utilized for extending over the central chamber 26 and the chambers 30 and 32 on either side thereof, the larger resilient membrane 24 has an O-ring 38 attached or integrally formed around its periphery for tightly fitting into a corresponding O-ring groove 40 formed in the underside 28 of the upper housing member 14 that extends around the periphery of all three chambers 26, 30 and 32 slightly inwardly of compression seal 41 formed between the housing members 12 and 14 when latched closed, as will be more fully described hereinafter. Depending on the type of membranes 24 and which chambers 26,30 and 32 they cover, the ethylene gas produced by the food items will be trapped in the corresponding chamber 26,30 or 32 isolated from the food in the container interior space 16. In either instance, the resilient membranes 24 are fixed at their peripheries and flex or expand outwardly into the chamber 26, or for the larger resilient membrane, additionally into chambers 30 and 32, or can flex and retract or be drawn inwardly toward the interior of the lower housing member 12. Where the larger resilient membrane 24 is utilized, top flange 42 at the upper end of the container body 12 assists in capturing the O-ring 38 in its corresponding groove 40 when the container body 12 and lid 14 are latched together, as best shown in FIG. 10.

For mounting the valves 20 and 22 to the upper housing member or lid 14, top side or surface 44 of the lid 14 is provided with a pair of recessed wells 46 and 48 from the bottom of which respective cylindrical members or standoffs 50 and 52 extend into central chamber 26 of the upper housing member 14, as best seen in FIG. 10. The valves 20 and 22 each include respective valve stems 54 and 56 that are mounted within cylindrical standoffs 50 and 52 and project therefrom, as shown in FIGS. 8 and 10. The resilient membrane 24 is provided with openings through which threaded valve ends 54a and 56a extend.

The valve stems 54 and 56 can be constructed similar to standard valves found on auto tires, e.g. Schrader valves. These valve stems 54 and 56 can be screwed down to either end of the cylindrical members 50 and 52 with nuts and washers. As shown in FIG. 10, the upper end of each of the valve stems 54 and 56 has a nut 60 screwed down onto a washer 62 clamped between the nut 60 and recessed surface 64 of wells 20 and 22. At the lower end of the valve stem 54 and 56, washers 66 and 68 sandwich the resilient membrane 24 with nut 70 screwed down to clamp against the washer 68 which, in turn, clamps the membrane between the washers 66 and 68 and the washer 66 to bottom interior surface 72 of the standoffs 50, 52. In this manner, the flexible membrane 24 is tightly clamped to the cylindrical members 50 and 52 and, with the smaller membrane 24, allowing it to flex into and out from the central recessed chamber 24, depending on pressure variations within the container space, and with the larger membrane 24 allowing it to flex also into and out from the side chambers 30 and 32 again depending on the pressure variations that occur in the container interior space 16.

Both the lower housing member 12 and the upper housing member 14 are preferably formed from a high strength composite plastic material such as KEVLAR (a registered trademark of E.I. Dupont, DeNumours Corporation of Wilmington, Del.) to withstand extremes in pressures and temperatures, for example, such as those found in airborne transport. The use of the mixture of super tough nylon and aramid fibers is effective to provide very durable yet lightweight containers 10, e.g. 34 oz. for approximately each cubic foot of interior space 16, and which have been found to be approximately 160% greater in strength and 80% lighter than corresponding stainless steel containers and that can withstand temperatures between approximately −320° F. and 400° F. The strength and temperature resistance of the present containers 10 allows for high temperature sterilization of the containers 10 for reuse as well as the ability to withstand transportation by air at altitudes of 30,000 ft and above where temperatures in unheated cargo bays are subject to the outside ambient temperature of approximately −110° F. The containers 10 can be formed by an injection molding process to allow for a wide variety of differently sized containers 10 to be readily produced and such that the container body 12 and lid 14 are integral plastic parts.

Referring to FIG. 2, the container body 12 includes a bottom or base wall 72 with sidewalls 74 and end walls 76 extending upwardly from the peripheral edges thereof. The walls 74 and 76 taper toward each other from the top flange 42 of the container body 12 down to its bottom 72 to enable a plurality of container bodies 12 to be stacked together for shipping purposes when not in use with the container lids 14. Approximately midway along the height of the walls 74 and 76, an interior horizontal shoulder 78 is formed in the container body 12 extending around the interior thereof.

When the lower housing members or bodies 12 are stacked or nested, as shown in FIGS. 7 and 8, the bottom 72 of one container body 12 immediately above another body 12 in the stack will rest on the interior shoulder 78 thereof.

Figure 9:
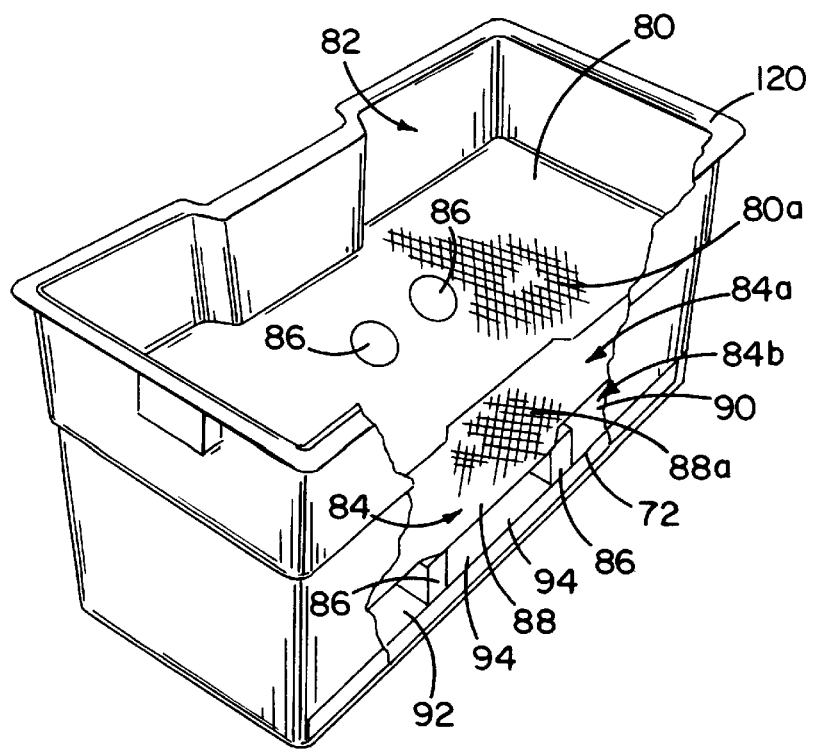
FIG. 9 is a perspective of the lower housing member showing an upper shelf resting on the interior shoulder and a lower shelf resting on interior vertical ribs forming chambers therebetween for holding solid cooling materials.

The shoulder 78 also allows a shelf partition member 80 to be placed in the container interior 16 resting on the shoulder 78 for separating the interior space 16 into an upper portion 82 and a lower portion 84 for separation of the products contained therein, as best shown in FIG. 9. The partition member 80 provides different levels in the container space 16 at which items can be held with items on the shelf partition member 80 separated from those items that are below in interior space portion 84. The shelf partition member 80 preferably is apertured for providing airflow throughout the interior space 16 between both the upper portion 82 and lower portion 84 thereof. In addition, the partition member 80 can be provided with a larger pair of apertures or finger holes 86 to enable the partition member 80 to be easily placed into the container body 12 on the shoulder 78 and to be removed therefrom for accessing items disposed in the container space portion 84.

To further compartmentalize the container interior space, a pair of laterally extending ribs 86 can be provided projecting up from the bottom 72 of the container body 12 and which are adapted to receive a shelf partition member 88 similar to member 80 thereon so as to further separate the interior space lower portion 84 into upper section 84a and lower section 84b thereof. The ribs 86 also serve to divide the lower section 84b into side chambers 90 and 92 on either side of a center chamber 94. These chambers 90–94 can be used for solid cooling materials such as dry or gel ice with the partition member 88 serving to protect foods, etc. from direct contact with the dry ice. Apertures 80a and 88a in respective partition members 80 and 88 allow for cool air to flow between the upper and lower container interior space portions 82 and 84 as generated by the dry ice.

For stacking, the containers 10 can be provided with integral stacking members. More particularly, the upper housing member or lid 14 can be provided with a pair of parallel laterally extending stacking ribs 96 and 98 projecting from the lid top side 44, as best seen in FIGS. 1 and 3. These stacking ribs 96 and 98 are spaced on either side of the recessed wells 46 and 48 and extend for the majority of the width of the top side 44 of the lid 14.

Figure 6:
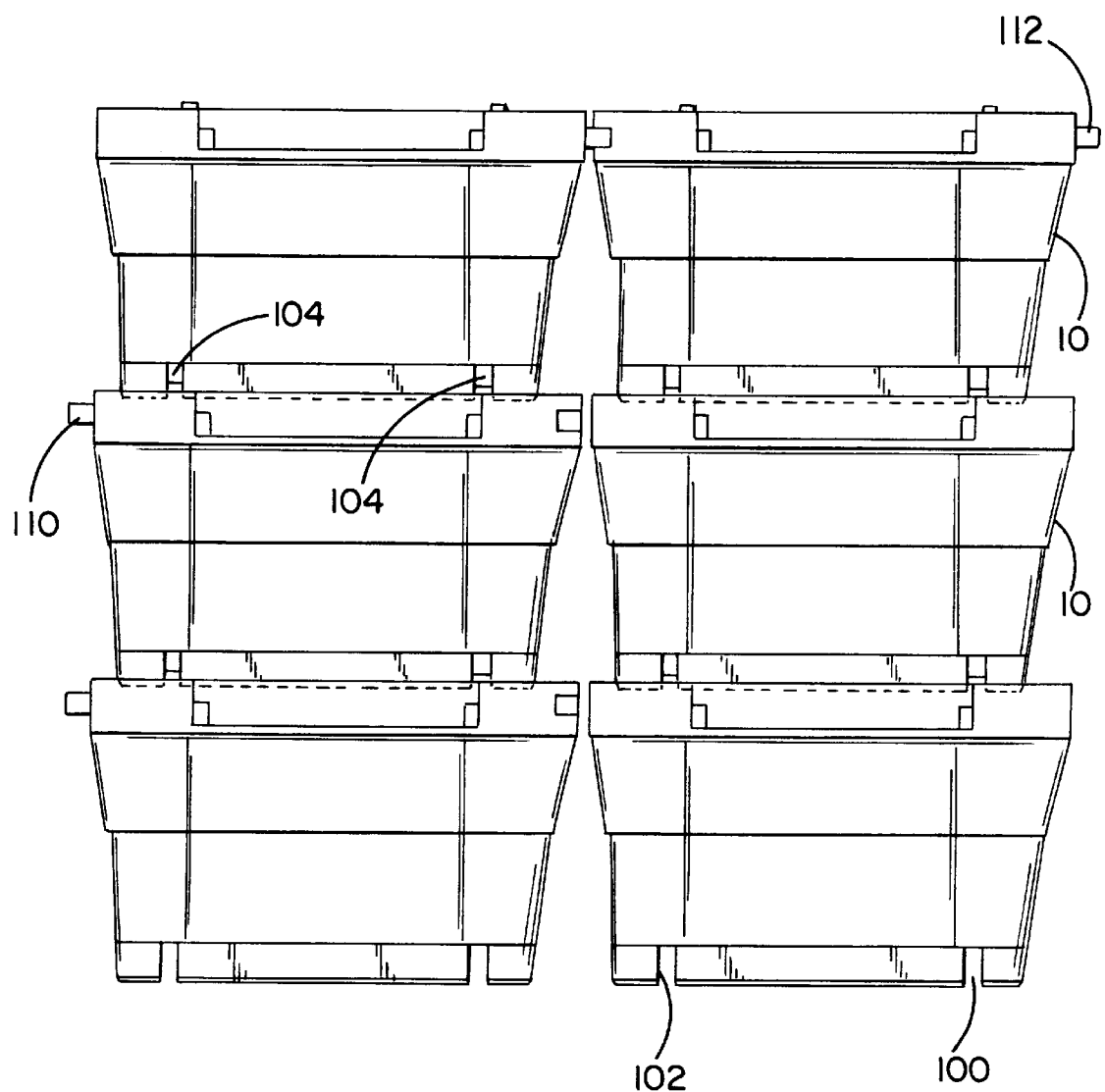
FIG. 6 is an elevational view showing vertical stacks of containers with the stacking ribs of the upper housing member received in channels formed in the bottom of the lower housing member and cooling channels formed at the bottom of the containers for air flow therethrough.

For receiving the ribs 96 and 98, the container body 12 can be provided with a pair of corresponding laterally extending channels 100 and 102 formed in its base wall 72, as shown in FIG. 6. The sizing of the ribs 96 and 98 relative to the channels 100 and 102 are such that when the ribs 96 and 98 are received in the channels 100 and 102, respectively, there is a space 104 formed over the ribs 96 and 98 extending the length of the channels 100 and 102. In this manner, airflow is permitted between stacked containers 10 via the spaces 104 between the ribs 96 and 98 and the bottoms of the channels 100 and 102.

To provide for additional cooling airflow between stacked containers 10, the container body 12 can be provided with a slotted construction at the bottom thereof so as to provided for air passageways for airflow under the base wall 72 of the containers 10. As can be seen in FIGS. 6 and 7b, the bottom of the lower housing members 12 includes two side channels 104 and 106 on either side of a larger central air cooling channel 108 as separated by rib receiving channels 100 and 102. The bottom channels 104–108 also serve as a convenient location to grasp a stack of the containers 10 such as with the tines of a forklift or other lifting means.

Figure 5:
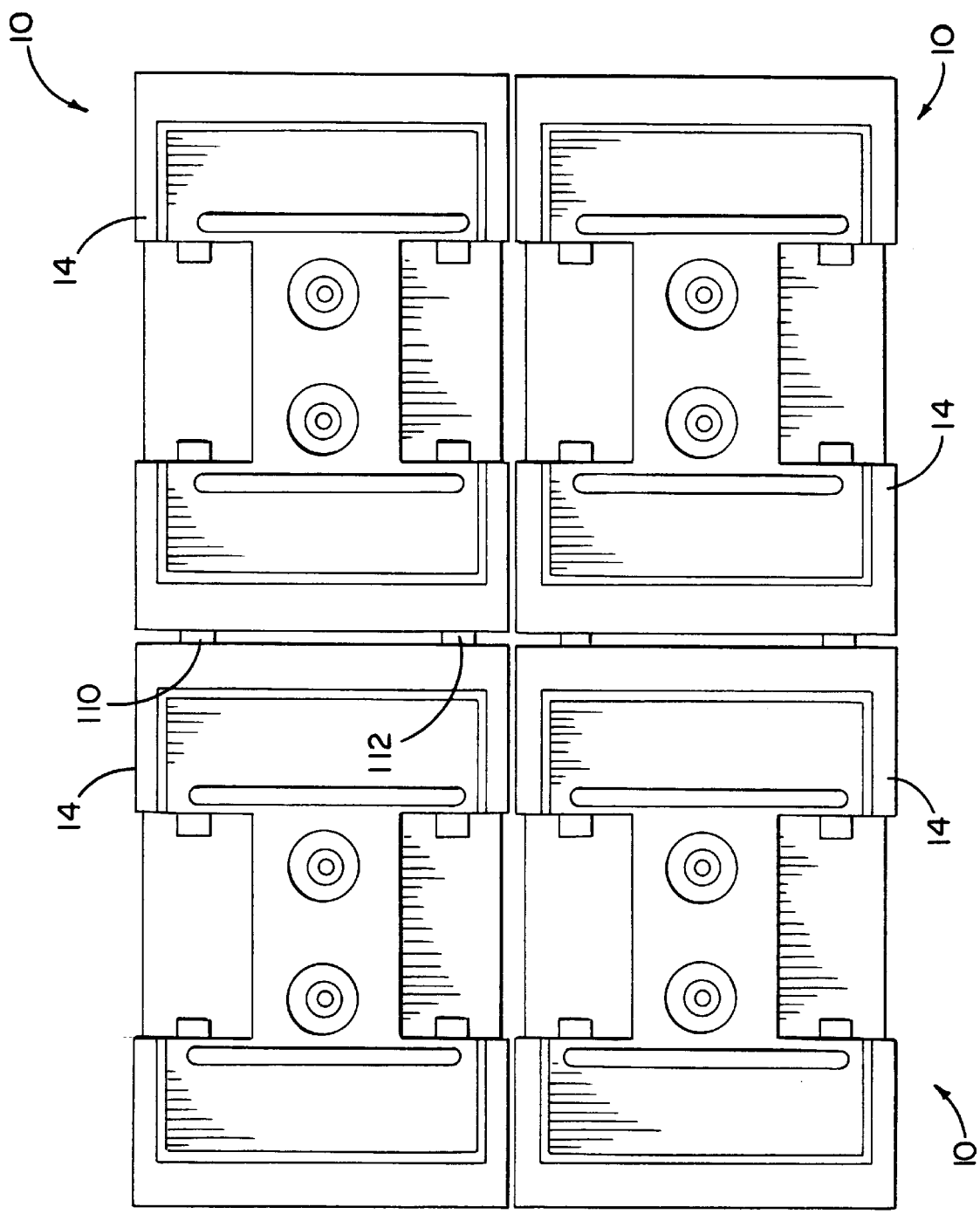
FIG. 5 is a plan view of a plurality of containers that are horizontally locked to laterally adjacent containers.

For vertical stacking of the upper housing members or lids 14 when not in use with the container bodies 12 for shipping thereof, the stacking ribs 96 and 98 are received in the recessed chambers 30 and 32 in the underside of an immediately adjacent container lid 14 disposed thereabove, as best shown in FIG. 7b. The containers 10 herein can also be horizontally locked together, as best seen in FIGS. 5 and 6. Horizontal stacking or locking is provided by lateral projections 110 and 112 extending from one end of the container lid 14 and corresponding lateral recesses 114 and 116 formed at the other end of the lid 14. The lateral projections 110 and 112 are sized to be securely received in the recesses 114 and 116 as by a male-female mating arrangement such that containers 10 that are laterally adjacent to each other can be horizontally locked together by inserting the projections 110 and 112 in corresponding recesses 114 and 116 of a laterally adjacent container 10.

Referring to FIG. 11, the lateral projections 110, 112 can be formed as cylindrical members for allowing the valves 20, 22 to be mounted therein for providing communication with the sealed container interior space 16. To this end, the cylindrical projections 110, 112 can each be provided with an annular recessed groove 110a, 112a adjacent the container lid 14 to provide a lip locking flange 113 for being grabbed by a coupling member of an external line such as when the container space 16 is being pressurized or gassed.

As previously mentioned, the housing members 12 and 14 are hermetically sealed together when latched closed with latch assembly 18 by a compression seal 41. To provide the hermetic seal 41, the upper housing member 14 is provided with a O-ring groove 118 extending around the periphery of its underside 28 spaced outwardly from O-ring groove 40 for the large resilient membrane 24. A corresponding resilient O-ring 120 is attached on the lower housing member top flange 42 and is received in the groove 118 by a compression fit when the upper housing member 14 is removably seated on top of the upstanding walls 74 and 76 and latched closed thereon by latch assembly 18.

Between the lateral stacking ribs 96 and 98, the upper housing member 14 has an intermediate portion 122 in which the recessed wells 46 and 48 are formed and on either side of which are lowered lid portions 124 and 126. Projecting upwardly from the lowered portions 124 and 126 on either end thereof are mounting bracket portions 128 and 130 each having respective spaced apart legs 128a and 128b, and 130a and 130b between which latch assembly 18 is pivotally mounted, as best seen in FIGS. 1 and 3. The latch assembly 18 includes a latch member 132 preferably made of a resilient plastic material to allow it to be resiliently cammed over the outer edge of the container body top flange 42 via ramp surface 134 and to tightly clamp the flange 42 against the underside 28 of the container lid 14 when the ramp surface 134 of the latch member 132 clears the flange 42 and snaps back thereunder to shift the latch member 132 into its locked position. Although only one is illustrated, it is preferred that a pair of latch assemblies 18 be utilized, one with each pair of bracket portions 128 and 130 on either side of the lid intermediate portion 122.

For allowing the container body 12 and lid 14 to be manually moved either individually or when latched together, each include gripping areas defined thereon. More specifically, the container body 12 is provided with integral handle members 136 formed at the upper portion of the end walls 76 just below the top flange 42. For moving the container bottom 12, a grip can be gained on the bottom of the members 136 at either end of the container body 12 for lifting. For the container lid member 14, elongate recesses 138 are formed at either end thereof extending between the lateral horizontal locking recesses 114 and 116 which allow a grip to be gained therein for lifting of the container lids 14. When the containers 10 are latched closed with the lid 14 seated and sealed on the container body 12, either the handle members 136 and/or the elongate recesses 138 can be used for lifting of individual containers 10 or a plurality of containers 10 in a stack.

Figure 12:
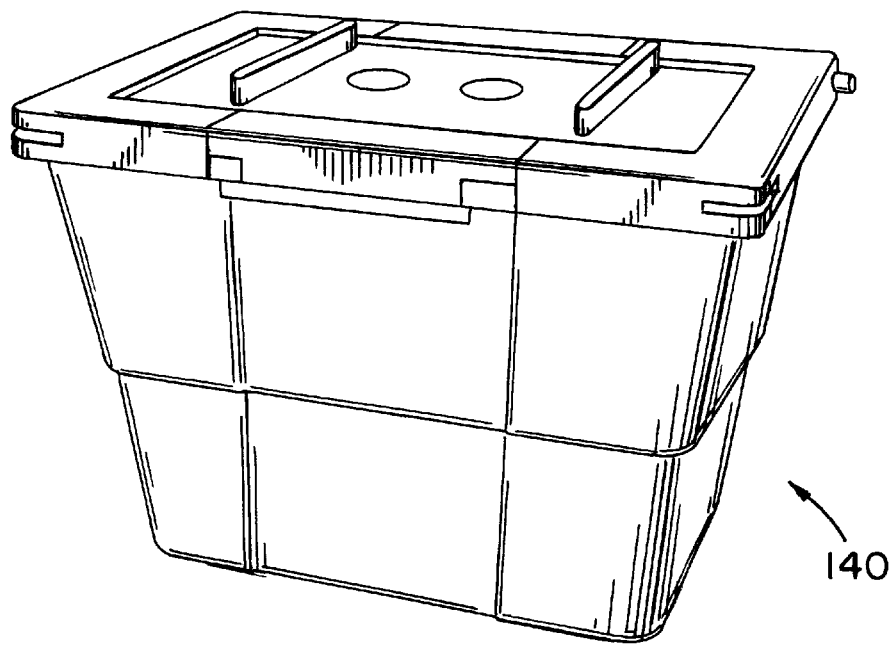
FIGS. 12 and 13 are perspective views of a slightly modified container in accordance with the present invention.
Figure 13:
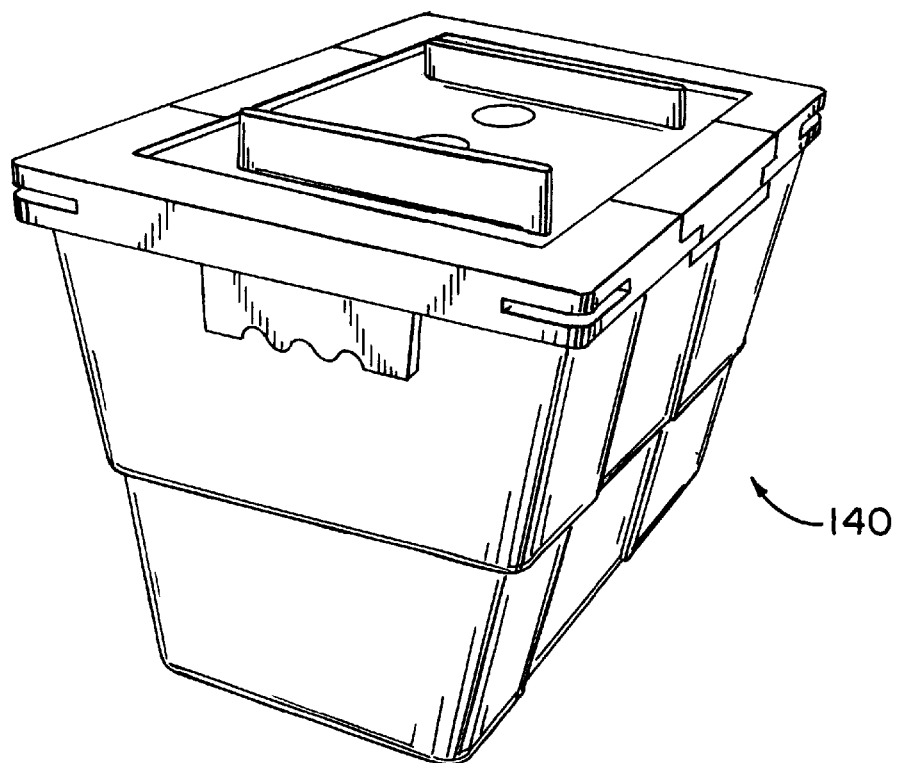
Figure 19:
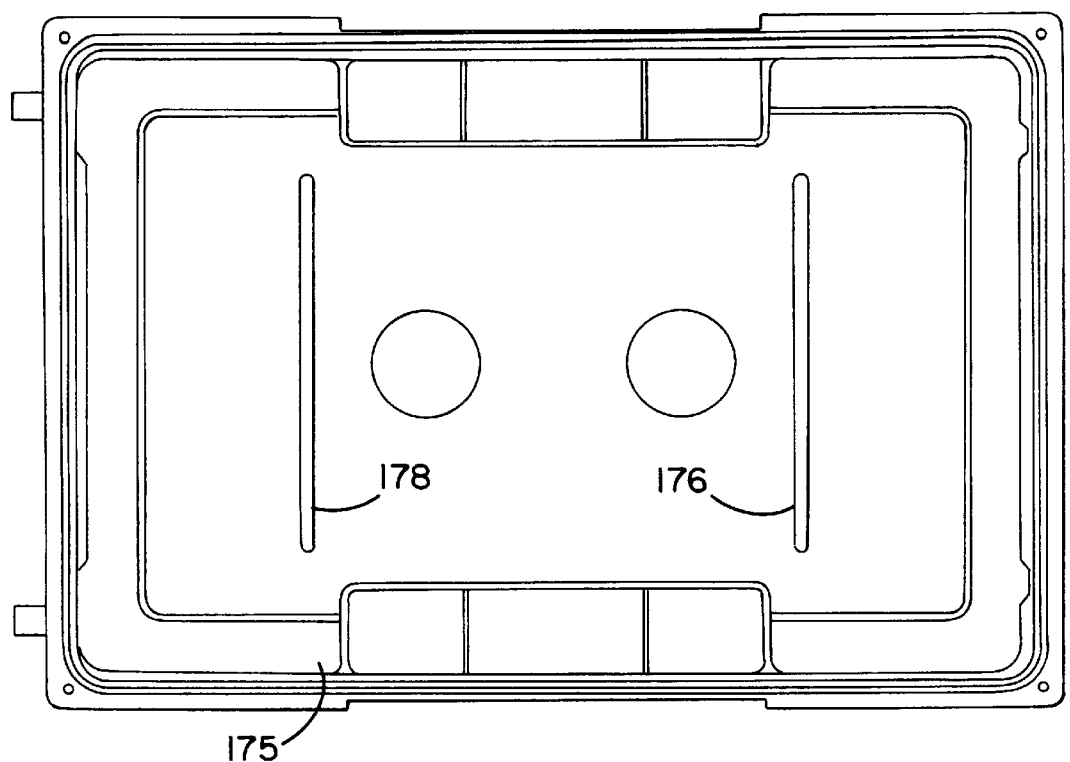
FIG. 19 is a bottom plan view of the upper housing member.
Figure 16:
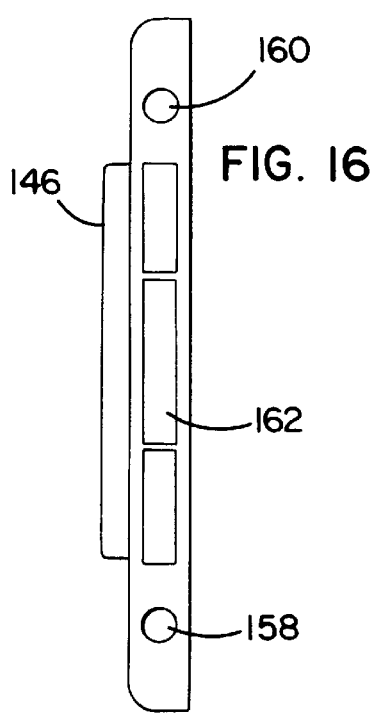
FIG. 16 is an end elevational view of the upper housing member taken in the direction indicated by arrow A in FIG. 15 and showing the lateral recesses for horizontal locking.
Figure 17:
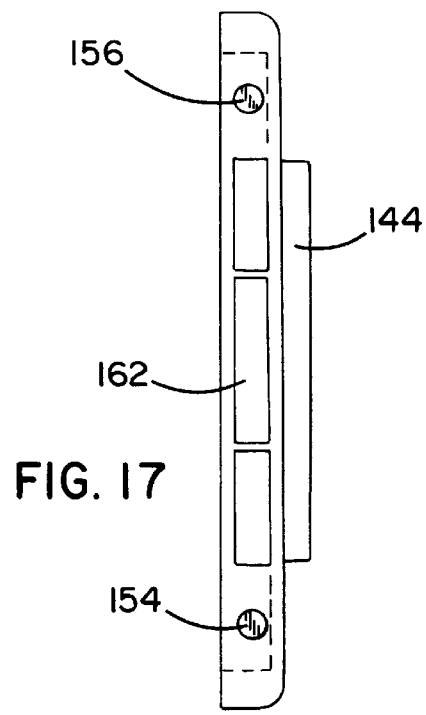
FIG. 17 is an end elevational view of the upper housing member taken in the direction indicated by arrow B in FIG. 15 and showing the lateral projections for horizontal locking.
Figure 21:
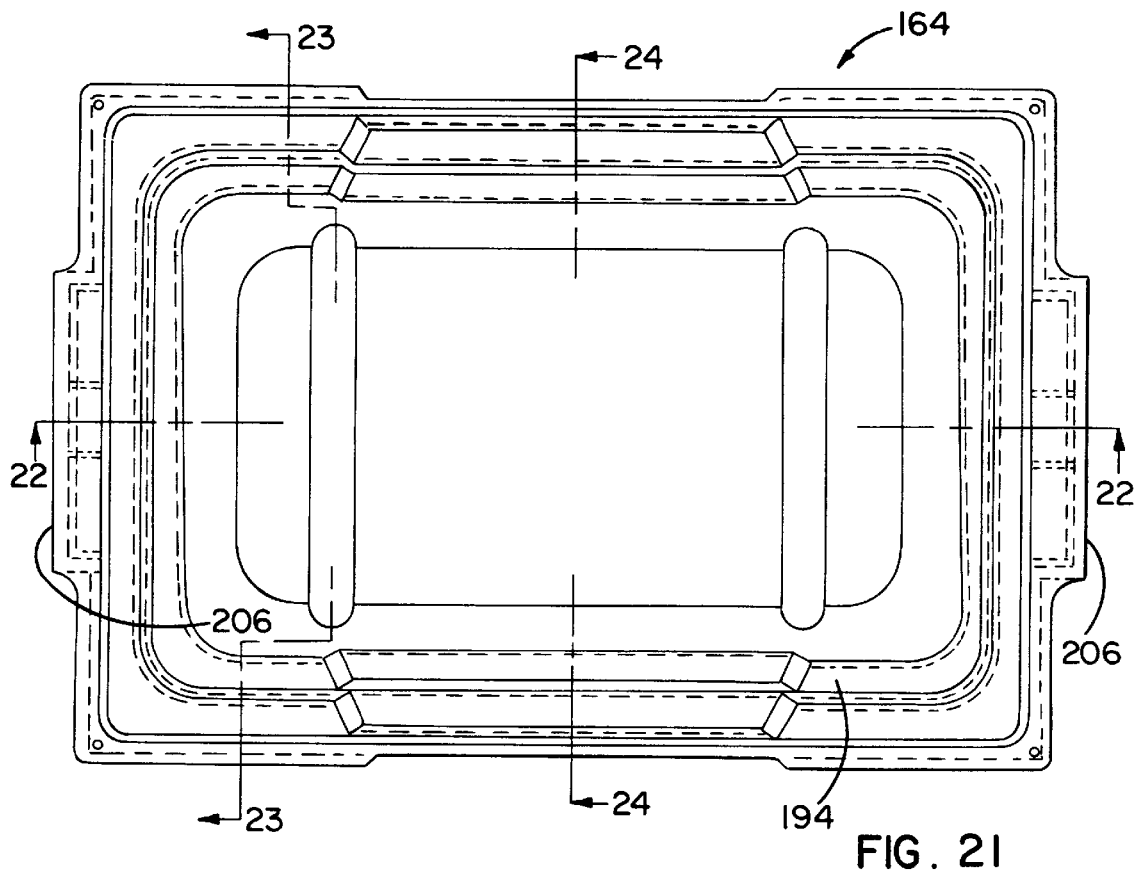
FIG. 21 is a plan view of the main lower housing member.

Turning next to FIGS. 12 and 13, there is shown a slightly modified container 140 which incorporates slight changes over the previously-described containers 10. FIGS. 14–19 are directed to the upper housing member or container lid 142 of container 140. The container lid 142 has laterally extending stacking ribs 144 and 146 on either side of recessed wells 148 and 150 formed in the top side 152 of the lid 142. The lid 142 also includes lateral projections 154 and 156 extending out from one end thereof and corresponding lateral recesses 158 to 160 formed in the other end of the lid 142 for horizontal locking of adjacent containers 140. The lid 142 further includes elongate recesses 152 extending between the projections 154 and 156 at one end of the container lid 142 and extending between the lateral recesses 158 and 160 at the other end of the lid 142 to provide hand holds for lifting of the individual lids 142, and the containers 140 with the lids 142 latched closed onto container bodies 154.

Figure 20:
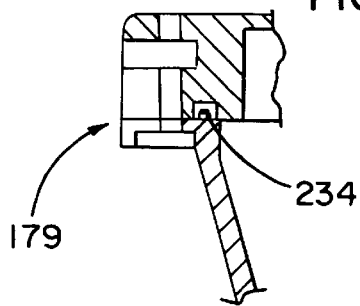
FIG. 20 is a fragmentary view of a compression seal formed between the upper and lower housing members when latched together.

The container lids 142 have lowered side portions 166 and 168 where latch assemblies 170 are mounted. At either end of the lid side portion 166 and 168 are a pair of opposing latch mounting apertures 172 and 174 for pivotally mounting the latch assemblies 170 thereto, as will be more fully described hereinafter. A difference between the lid 142 and lid 14 is the lack of corresponding recessed chambers 26, 30 and 32 of lid 14. For stacking of individual lids 142, underside 175 of lid 142 is provided with a pair of small lateral locating members 176 and 178 spaced inwardly from the stacking ribs 144 and 146 on the lid top side 152. In this manner, the lids 142 are stacked by arranging adjacent lids 142 so that stacking ribs 144 and 146 are spaced outwardly from corresponding locating members 176 and 178 of a lid 142 immediately above a lower lid 142 in the stack. Another difference lies in the lack of cylindrical members extending from recessed wells 148 and 150 with the valves 20 and 22 instead being mounted in the wells 148 and 150 themselves. Similar to containers 10, the container 140 is hermetically sealed by compression seal 179 formed between lid 142 and container body 164 latched closed by latch assembly 170 thereon, as best seen in FIG. 20. In this regard, the lid 142 has a peripheral skirt wall 180 having a downwardly facing groove 181 formed therein for receipt of a resilient seal member attached to the container body 164, as will be more fully described herein.

While the container lid 142 is shown in a form without a resilient membrane 24, it is also contemplated that the lid 142 can be provided in a modified form similar to lid 14 so that the resilient membrane 24 can be utilized therewith lying across valves 20 and 22 and covering recessed chamber(s) formed in the underside of the lid 142.

Turning next to FIGS. 21–27, the container body 164 is similar to container body 12 and includes a base wall 182 having side walls 184 and end walls 186 upstanding from the peripheral edge thereof with a top flange 188 projecting outwardly from the top end of the walls 182 and 184. The base wall 182 has a pair of channels 190 and 192 in which the stacking ribs 144 and 146 of the lid 142 are received for vertical stacking of the containers 140. The container walls 184 and 186 also include a horizontal shoulder 194 formed on their interior surfaces extending therearound allowing the container bodies 164 to be stacked together with the bottom of base wall 182 of one container body 164 resting on the shoulder 194 of another container body 164 immediately therebelow in the stack. In addition, the shoulder 194 allows a shelf partition member 196 (FIGS. 36–38) to rest thereon to divide the interior of the containers 140 into different levels for product separation therein. The shelf partition member 196 preferably includes apertures 198 to allow airflow between upper and lower portions of the container interior divided thereby, and finger holes 100 for installing and removing the shelf member 196 in the container body 164.

Figure 41:
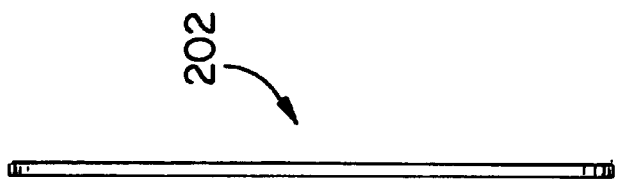
FIGS. 39–41 are various views of a lower shelf partition member for placement in the lower housing member.
Figure 39:
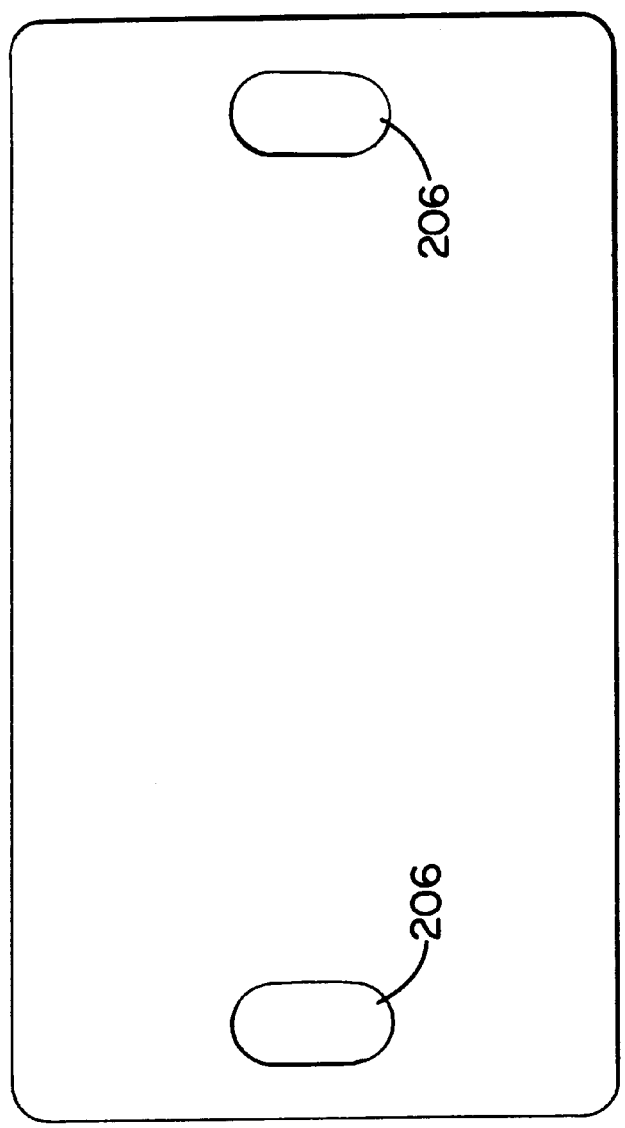
Figure 40:
Figure 45:
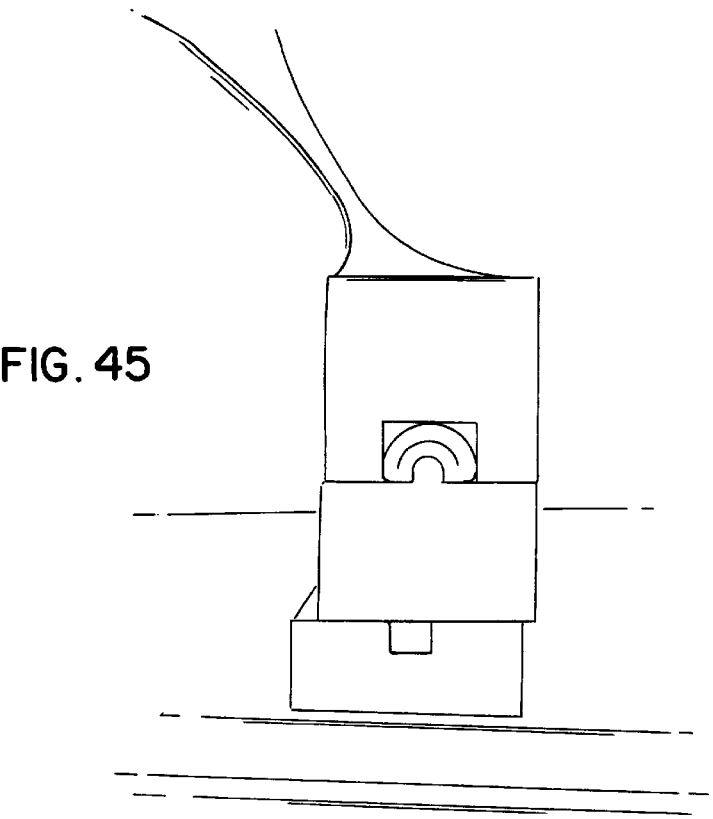

A lower shelf partition member 202 can also be provided for the use in the container body 164, as shown in FIGS. 39–41. The lower shelf member 202 can be placed on the top of the raised portions 204 which project up from the base wall 182 and 204 and which form the stacking channels 190 and 192 in the container body base wall 182. As shown, the partition member 202 is not apertured except for finger holes 206 provided at either end thereof for lowering and raising the shelf 202 into and out from the container body 164.

Figure 28:
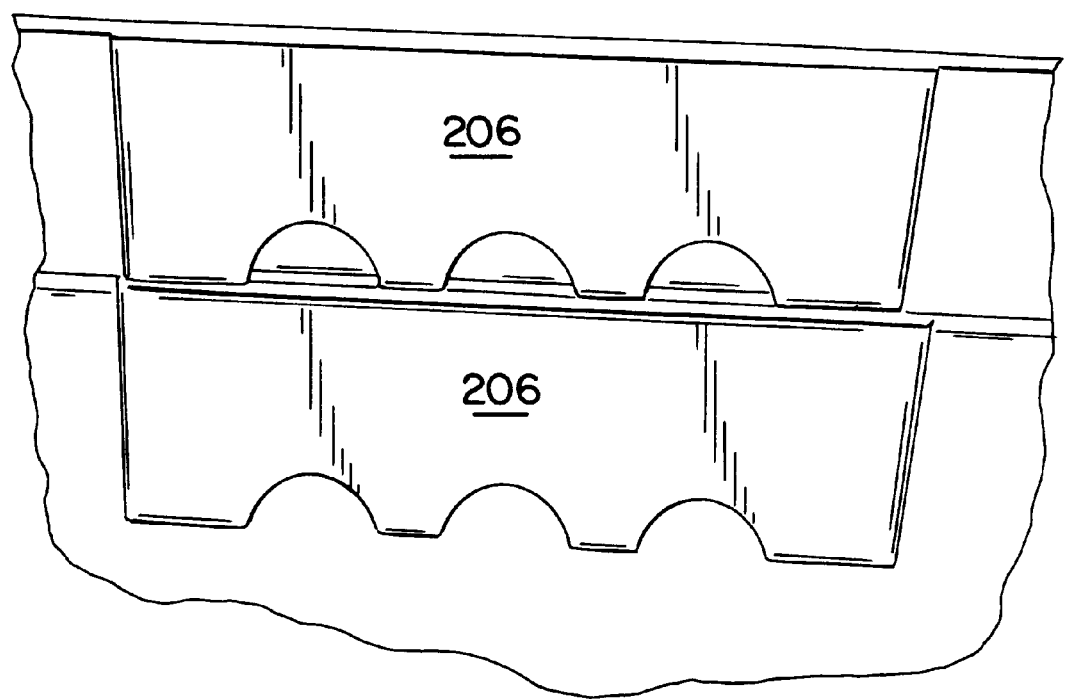
FIG. 28 is a perspective view of a plurality of lower housing members in a vertical stack.
Figure 29:
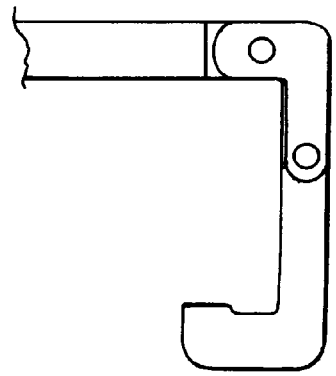
FIG. 29 is a side elevational view of a latch assembly for sealing the upper housing member on top of the lower housing member.

For lifting of the container bodies 164, the container bodies 164 are provided with integral handle members 206 at either end thereof similar to container bodies 12. The handles 206 have a contoured bottom 208 with finger indentations 210 to provide gripping locations for lifting of the container bodies 164. In addition, the handle bottoms 208 are disposed such that when the container bodies 164 are in stacked relation with the base wall 182 of an upper container body 164 supported on the shoulder 194 of a lower container body 164 in the stack, the bottoms 208 of the handles 206 will be engaged with the top of the container body flange 188 therebelow, as best seen in FIG. 28.

As previously mentioned, the containers 140 include a latch assembly 170 for locking the container lid 142 onto the container body 164. The latch assembly 170 is mounted to the lid 142 via latch mounting member 212, as shown in FIGS. 30–32. The latch mounting member 212 is mounted one at each of the lowered side portions 166 and 168 on the container lid 142 by way of mounting apertures 172 and 174 on either side thereof and corresponding mounting apertures 214 formed in the latch mounting member 212.

FIGS. 33–35 illustrate a latch member 216 that is pivotally attached to the mounting member 212 via mounting apertures 218 thereof aligned with apertures 220 of the mounting member 212 for receiving pivot pins (not shown) therethrough. More specifically, the latch mounting member 212 has a generally U-shaped construction with an elongate section 222 and leg sections 224 formed at either end thereof. The apertures 214 are formed at the distal ends of the leg sections 224 and apertures 220 extend parallel to the apertures 214 and are formed as through apertures so as to be open to space 226 formed between the leg sections 224.

The latch member 216 has a length slightly less than the distance between the inside ends of the mounting member leg sections 224 so as to fit therebetween with the apertures 218 thereof aligned with corresponding apertures 220 in the mounting member leg sections 224. The latch member 216 includes a hook end 228 for grabbing and locking under overhanging lip 230 of the container body flange 188. Thus, with the latch member 216 pivoted down to its locked position, the compression seal 179 between the container lid 142 and body 164 hermetically seals the interior of the container 140 from communication with the exterior environment.

Referring next to FIGS. 20 and 42–45, a resilient seal member 232 is attached on top of raised nub projection 234 which is aligned with seal groove 181 when the container lid 142 is placed on the container body 164. As shown, the seal member 232 can take the form of a silicone rubber D-ring seal having a width thereacross slightly greater than the corresponding width of the groove 181. An O-ring or other shape seal could also be employed as an alternative to the preferred and illustrated D-ring seal 232. The nub projection 234 is attached to flat bottom 236 of the D-ring seal 232, and when the latch member 216 is shifted to its locking position, the nub projection 234 collapses the flat bottom 236 into space 238 defined between the bottom 236 and the upper curved portion 240 of the D-ring seal 232, as can be seen in FIG. 44. In this manner, there is a double layer of rubber seal material tightly compressed together between the nub 234 of the container body 164 and the groove 181 of the lid 142 for creating a generally impermeable barrier from the container interior to the outside environment when the container lid 142 and body 164 are latched together.

Figure 49:
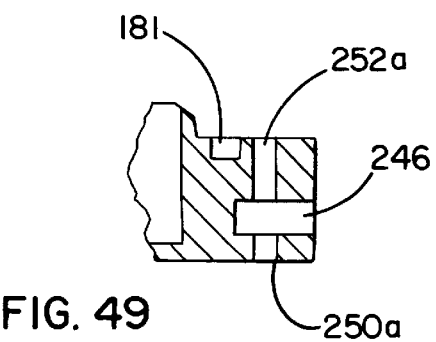
FIG. 49 is a cross-sectional view of the container lid corner with the security device removed.
Figure 22:
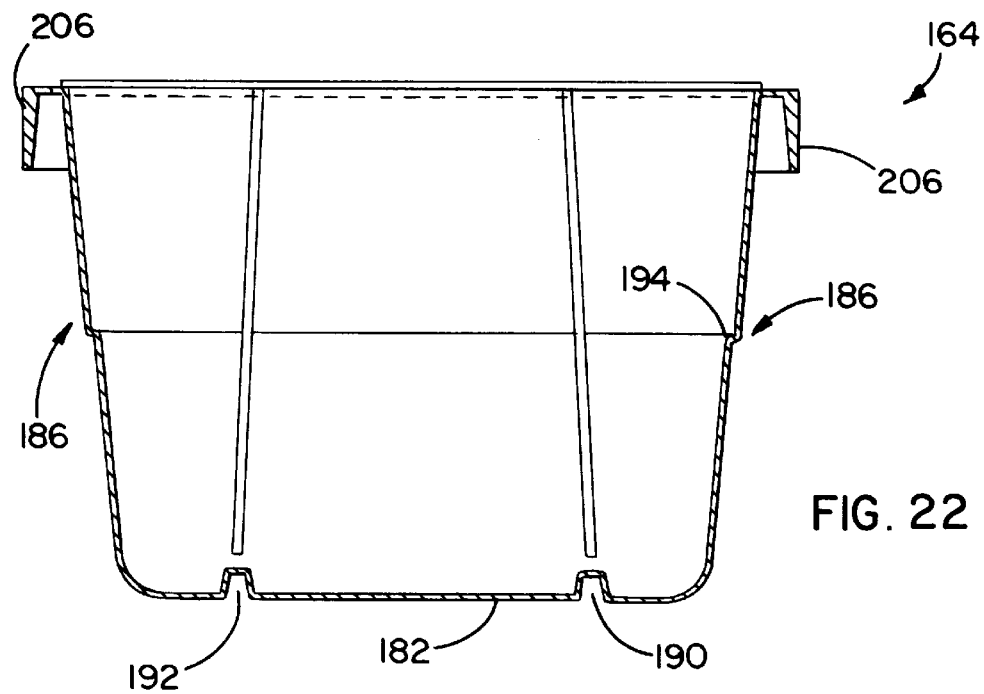
FIG. 22 is a cross-sectional view taken along line A—A of FIG. 21.
Figure 23:
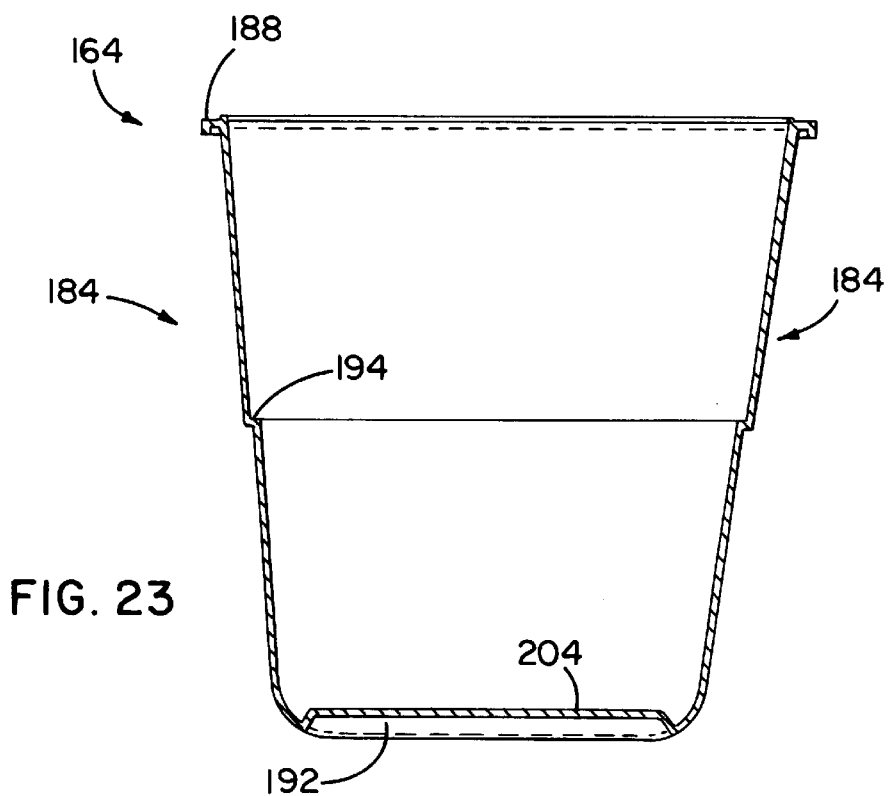
FIG. 23 is a cross-sectional view taken along line B—B of FIG. 21.
Figure 24:
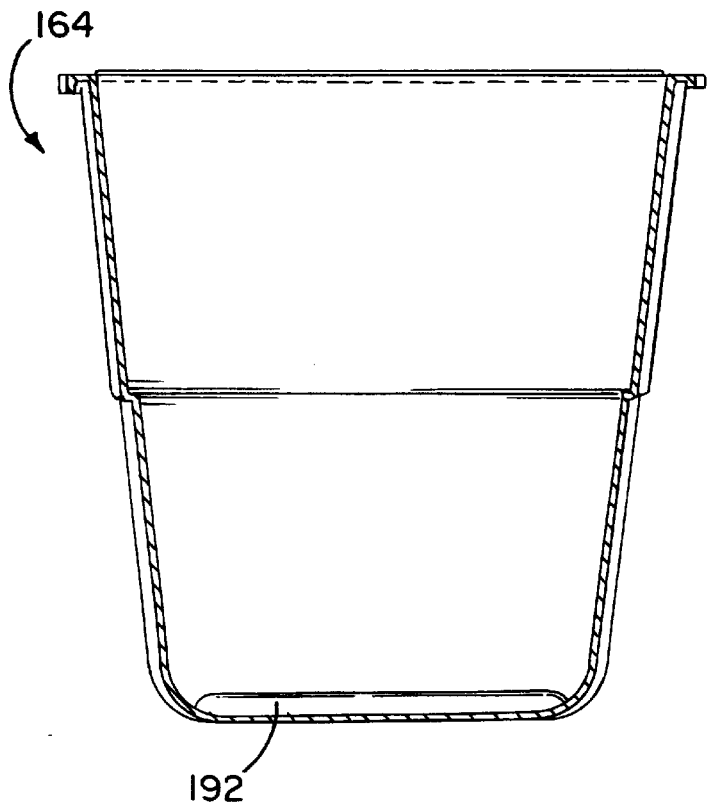
FIG. 24 is a cross-sectional view taken along line C—C of FIG. 21.
Figure 25:
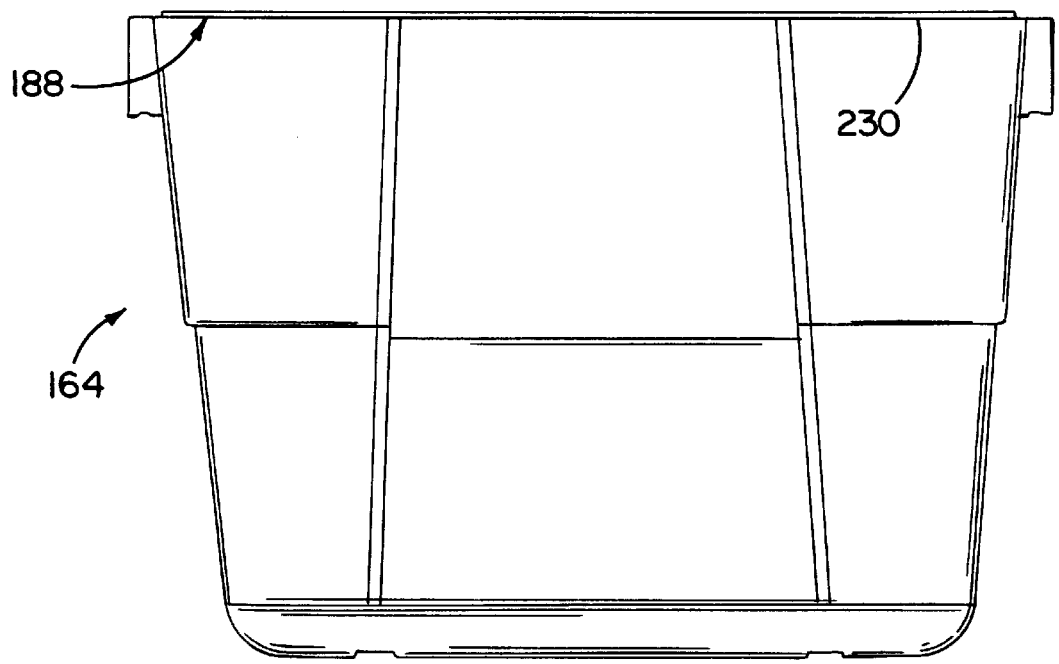
FIG. 25 is a side elevational view of the lower housing member.
Figure 27:
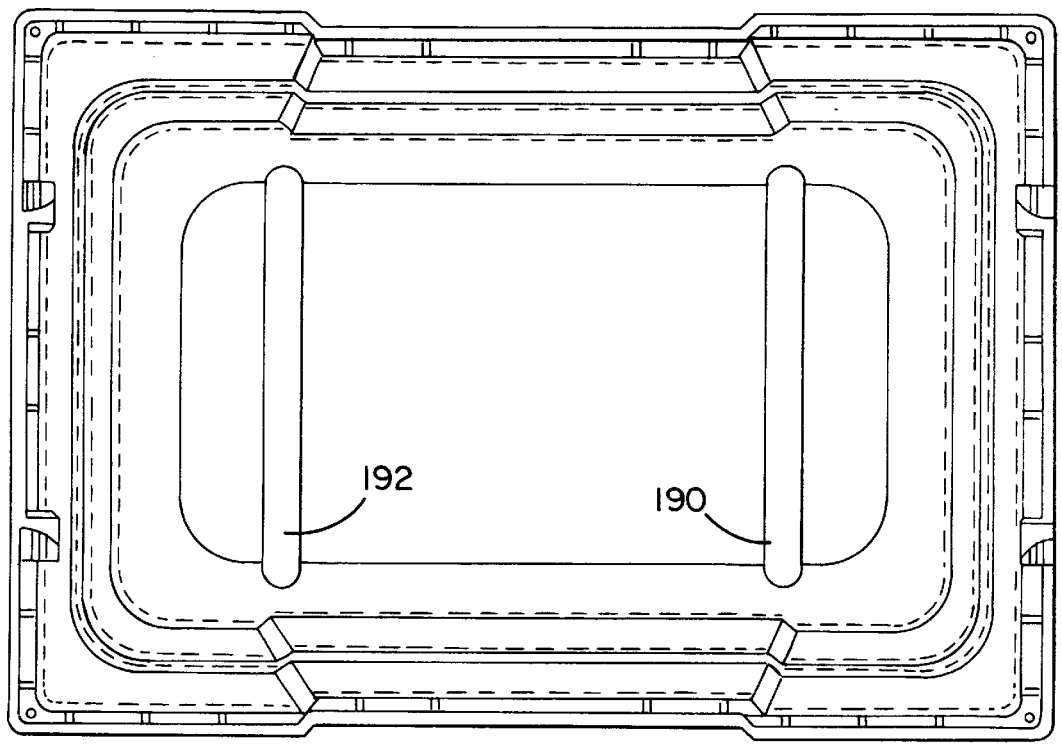
FIG. 27 is a bottom plan view of the lower housing member.
Figure 26:
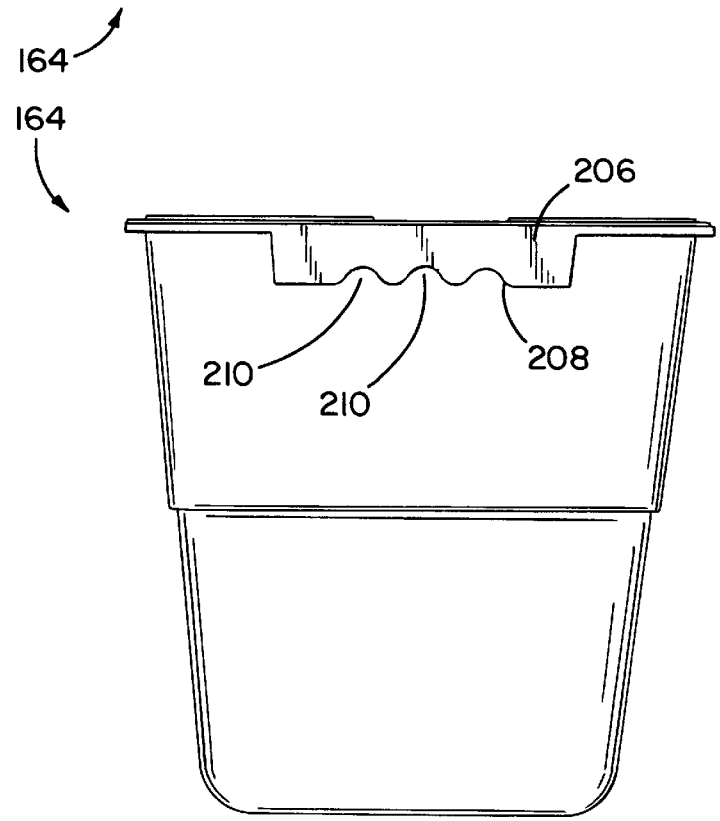
FIG. 26 is an end elevational view of the lower housing member.
Figure 46:
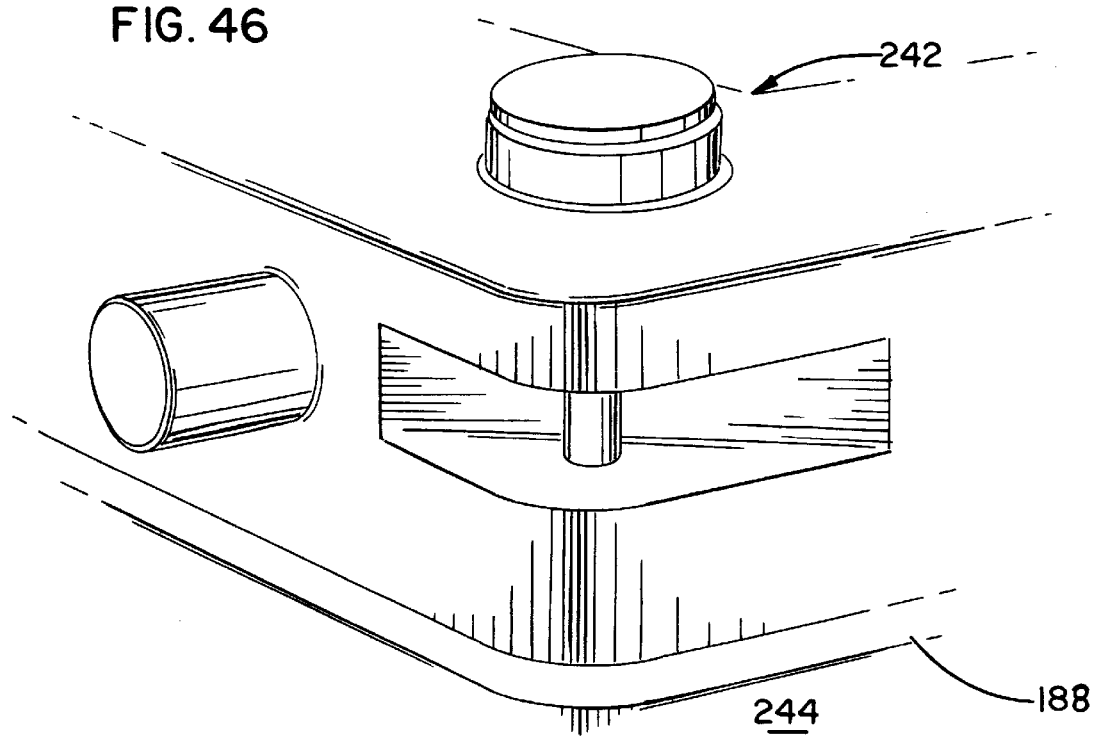
FIG. 46 is a perspective view of a corner of the container with a security device attached thereto.
Figure 47:
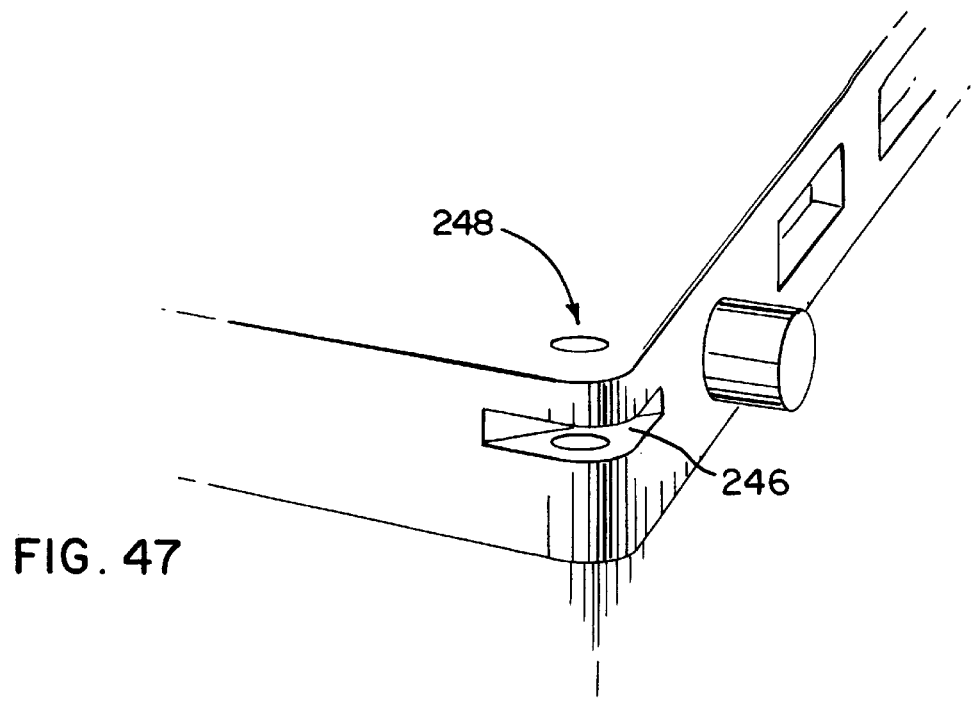
FIG. 47 is a perspective view of the container lid corner with the security device removed.
Figure 48:
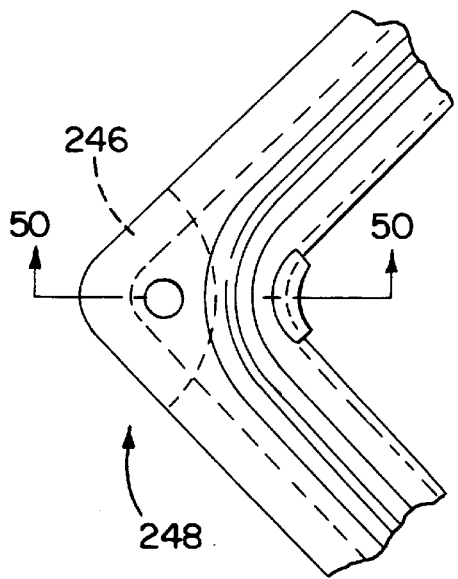
FIG. 48 is a plan view of the container lid corner with the security device removed.
Figure 50:
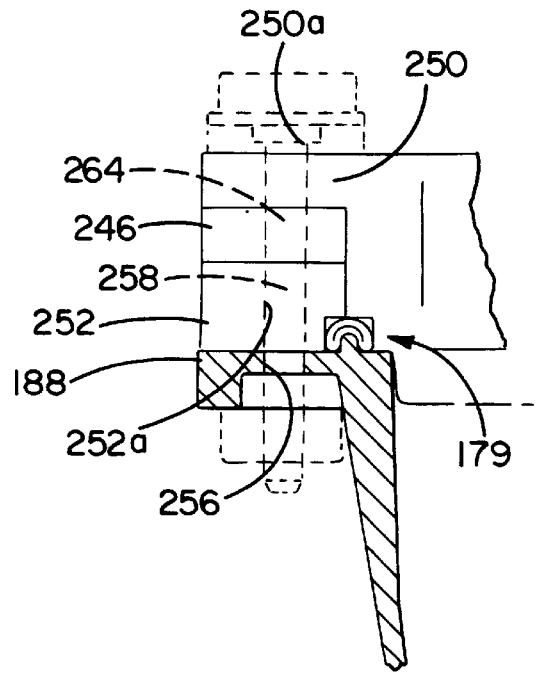
FIG. 50 is a cross-sectional view taken along line A—A of FIG. 48 with the security device shown in phantom.

For limiting access to the contents in the interior of the container 140, a security device 242 (FIG. 51) can be provided which keeps the container lid 142 locked on the container body 164 despite unlatching of latch members 116. One such security device 242 is shown in FIGS. 46 and 50 attached at one of the corners 244 of the container 140 with the remaining container corners also preferably being provided with security devices 242 thereat. As can be seen in FIGS. 47–49, the container lid 142 has right angle slots 246 formed extending around its corners 248 so that there is an upper portion 250 and a lower portion 252 of the container lid 142 spaced by the slots 246 at the corners 248 thereof. Both the upper and lower portions 250 and 252 include respective aligned vertical apertures 250a and 252a and the flange 188 of the container body 154 at the corner 254 thereof also includes a vertical aperture 256 aligned with the lid apertures 250a and 252a for receiving a security pin 258 of the security device 242 therethrough.

Figure 57A:
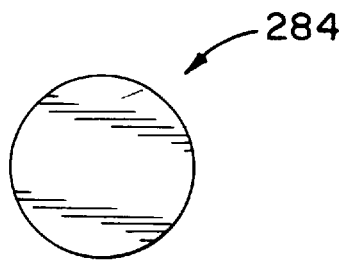
FIG. 57A is a plan view of a cover member of the security device.
Figure 57B:
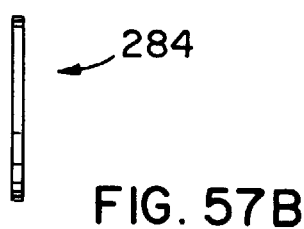
FIG. 57B is a side elevational view of the cover member of FIG. 57A.

With the pin 258 received through the apertures 250a and 252a of the lid corner 258 and aperture 256 of the container body corner 254, head and foot portions generally designated 260 and 262 permanently attached at either end of the pin 258 keeps the containers 140 locked against opening until a cutter (not shown) severs the portion 264 of the pin 258 exposed in the slot 246 thus destroying the security device 242. More particularly, the pin 258 has a shank 266 with a series of annular grooves 268 formed at its lower end and an enlarged head 270 formed at its top end, as best seen in FIGS. 52a and 52b. For forming the security device head portion 260, a cap member 272 is provided, as shown in FIGS. 53a and 53b. The cap member 272 has a stepped throughbore 274 having progressively widening diameter portions with a small diameter portion 276 leading to an intermediate diameter portion 278 which, in turn, opens to a large diameter portion 280 of throughbore 274. Between the small diameter portion 276 and intermediate diameter portion 278, an annular shoulder surface 282 is formed against which the bottom of the enlarged flange head 270 of the pin 258 seats with the shank 266 extending through the small diameter throughbore portion 276 and out therefrom. A blank cover member 284 (FIGS. 57A and 57B) is tightly received in the large diameter portion 280 of the cap throughbore 274 to complete the assembly of the security device head portion 260. The cover member 284 can be of an aluminum material and is adapted to receive indicia thereon which serves to identify the contents of the locked container 140 for tracking purposes.

Figure 54A:
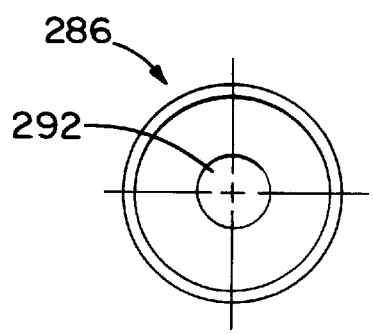
FIG. 54A is a plan view of a retainer cup of the security device.
Figure 54B:
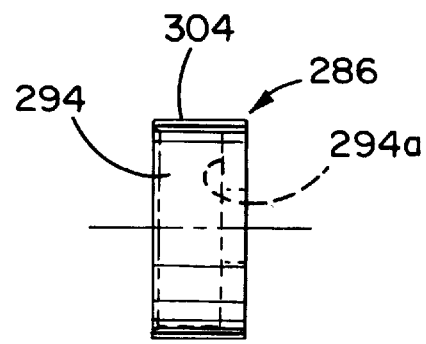
FIG. 54B is a side elevational view of the retainer cup with FIG. 54A.
Figure 55A:
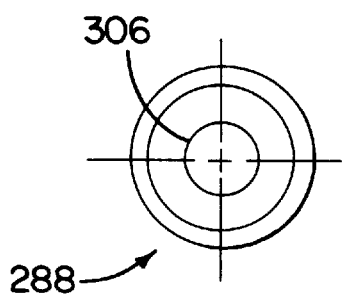
FIG. 55A is a plan view of a retainer cap of the security device.
Figure 55B:
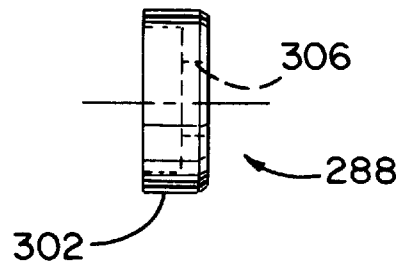
FIG. 55B is a side elevational view of the retainer cap with FIG. 55A.

The foot portion 262 of the security device 242 includes a retainer cup 286 (FIGS. 54a and 54b), a retainer cap 288 (FIGS. 55a and 55b), and a retainer clip 290 (FIGS. 56a and 56b) disposed in the cup 286 closed off by cap 288. To assemble the foot portion 262, the cup 286 is slid onto the grooved bottom end of the shank 266 via central aperture 292 formed therein which opens to larger interior cavity 294 of the retainer cup 286. The cavity 294 faces and opens downwardly towards the bottom end of the pin shank 266.

Retainer clip 290 has a generally annular configuration with inclined portions 296 projecting at an angle from flat base portion 298 thereof. The inclined portions 296 and base 298 have a central opening 300 extending therethrough for allowing the clip 290 to be slid onto the shank until the base 298 abuts against the bottom surface 294a of the cup cavity 294. The retainer clip 290 is preferably formed of spring steel material, and as the clip is slid onto the grooved shank end, the inclined portions 296 will deflect over the peaks 268a of the shank 256 formed between the annular grooves 268 with the radially inner ends 296a of the inclined portions 296 seating in an annular groove 268 when the base 298 is abutted against cavity bottom surface 294a, as shown in FIG. 51. With the clip 290 so assembled onto shank 256, the clip 290 will prevent the retainer cup 286 from being removed off from the bottom of the shank 256. The retainer cap 288 has an axially extending annular wall 302 sized to be tightly received in cavity 294 as by a friction fit against axially extending annular wall 304 of the cup 286 with the bottom end of the pin shank 266 projecting out through central aperture 306 formed in the cap 288. In this manner, the cap 288 limits access to the spring steel clip 290 in the cup cavity 294.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. A stackable, atmospheric controlled container comprising:

a main lower housing member having a bottom and walls upstanding therefrom for containing perishables and other atmosphere sensitive items;

an upper housing member for being removably seated on top of the upstanding walls and cooperating with the lower housing member to form an interior container space in which perishable items are sealed for storage and transportation;

a groove and resilient seal of the lower and upper housing members which cooperate to hermetically seal the container interior space from the exterior environment when the upper member is seated on the upstanding walls;

latch portions of the container members for being engaged and releaseably locking the upper member on the lower member with the seal tightly received in the groove by a compression fit;

an inlet valve of the container which provides communication between the interior space and exterior of the sealed container to allow selected gases to be introduced into the container interior space;

an outlet valve of the container which provides communication between the interior space and exterior of the sealed container to control pressure in the interior space and to exhaust gas from the space for being replaced with a different gas; and stacking members formed on the upper and lower housing members for allowing a plurality of containers to be securely stacked and maintaining spaces between stacked containers for air flow therebetween to assist in keeping the container interior space at temperatures that minimize damage to the items sealed in the container for storage and transportation.

2. The container of claim 1 including a resilient member in the container interior space extending across the valves and through which the valves extend for supplying gases to and exhausting gases from the interior space with the member flexing in response to pressure changes in the container interior space to keep the space within a desired predetermined pressure range.

3. The container of claim 2 wherein the resilient member is a flexible membrane of a material that is permeable to a specific type of gas exposed to one side of the membrane for travel therethrough to isolate the specific gas from the items sealed in the container.

4. The container of claim 3 wherein the membrane material is permeable to ethylene gas for trapping ethylene produced from food items in the container space above the membrane isolated from the food items below the membrane.

5. The container of claim 2 wherein the interior space includes a plurality of chambers with the valves extending in one of the chambers and the resilient member extending across the one chamber to separate the one chamber from the remainder of the interior space.

6. The container of claim 5 wherein the one chamber is formed in an interior recess of the upper member, and the chambers further include a pair of recessed chambers of the upper member on either side of the one recessed chamber.

7. The container of claim 6 wherein the resilient member extends across the side chambers for separating the chambers of the upper member from the remainder of the interior space in the container.

8. The container of claim 1 wherein the lower housing member includes a shoulder formed on the interior of the upstanding walls, and
a shelf partition member for resting on the shoulder to provide different levels in the container interior space for holding the items therein with the items on the shelf separated from those items below the shelf.

9. The container of claim 8 wherein the lower housing member includes interior ribs on top of which the partition member extends with the ribs forming chambers therebetween for holding solid cooling materials, and the partition member includes apertures therein for cooling of the interior space above the partition member by the cooling materials therebelow with the items in the container space separated from contact with the cooling materials by the shelf partition member.

10. The container of claim 9 wherein the ribs support another partition member thereon and below the partition member resting on the shoulder.

11. The container of claim 8 wherein the lower member upstanding walls taper toward each other from top to bottom to allow a plurality of lower members to be vertically stacked with the bottom of one lower member supported by the shoulder of another lower member immediately below the one lower member in the stack.

12. The container of claim 1 wherein the stacking members include stacking ribs of the upper housing member and channels in the bottom of the lower hou sing member for receiving the ribs tightly therein with space over the top of the ribs for providing air flow between upper and lower housing members of adjacent stacked containers.

13. The container of claim 12 wherein the upper housing member includes interior recesses to allow a plurality of upper housing members to be vertically stacked with the ribs of one upper housing member received in the recesses of another upper housing member immediately above the one upper housing member in the stack.

14. The container of claim 1 wherein the stacking members include lateral projections and recesses which cooperate to lock containers together that are laterally adjacent each other.

15. A shipping container for keeping perishable items fresh and free from damage, the container comprising;
a container body having strong rigid walls for withstanding impacts to minimize damage to the items therein;
a lid for closing an interior space of the container when placed on the container body;
a hermetic seal between the lid and container body to seal the container interior from the exterior environment;
valves of the container for regulating the pressure and atmosphere of the container interior to keep the perishable items sealed therein fresh over long durations; and
a membrane attached in the container interior to separate at least one interior chamber of the container from the remainder of the container interior space;
the membrane being permeable to gas flow in a direction from the container interior space into the chamber and not permeable to flow from the chamber to the interior space for trapping and isolating specific types of gases that tend to cause damage to perishable items,
the membrane further being flexible to respond to changes in pressure in the container interior space by flexing to change the volume of the interior space undergoing pressure change in relation to the interior chamber thereof to minimize unintended pressure losses or gains in the container interior space.

16. The container of claim 15 wherein the container space has at least one lower chamber for solid cooling materials, and an apertured shelf member is placed over the lower chamber to prevent contact of perishables with the cooling materials and to allow cold air flow therethrough and to the perishables supported thereon.

17. The container of claim 15 including stacking members of the container lid and body that allow a plurality of sealed containers to be vertically and horizontally stacked together.

18. The container of claim 15 including a security device that locks the container lid and body together to prevent access into the container interior space until the security device is destroyed.

19. The container of claim 18 wherein the security device includes a shank that projects through the lid and container body and has a portion exposed for being severed to destroy the security device and allowing the container to be opened for accessing the interior thereof.

* * * * *